(12) United States Patent
Kainuma

(10) Patent No.: US 6,308,226 B1
(45) Date of Patent: Oct. 23, 2001

(54) COMMUNICATION METHOD AND SYSTEM FOR OBJECTS MOVABLE IN NETWORK

(75) Inventor: Tatsuya Kainuma, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/041,761

(22) Filed: Mar. 13, 1998

(30) Foreign Application Priority Data

May 19, 1997 (JP) ................................................ 9-129001

(51) Int. Cl.[7] ........................................................ G06F 9/54
(52) U.S. Cl. ................................................................ 709/316
(58) Field of Search .................................... 709/300–305, 709/200–253, 310–330; 711/148

(56) References Cited

U.S. PATENT DOCUMENTS

| | | | |
|---|---|---|---|
| 5,551,035 | * 8/1996 | Arnold et al. | 709/303 |
| 5,613,148 | * 3/1997 | Bezviner et al. | 709/203 |
| 5,655,101 | * 8/1997 | O'Farrell et al. | 711/148 |
| 5,701,484 | * 12/1997 | Artsy | 709/303 |
| 5,815,710 | * 9/1998 | Martin et al. | 709/303 |
| 5,946,693 | * 8/1999 | Mizuyama et al. | 707/103 |

OTHER PUBLICATIONS (no author given) OMG TC Document 95–11–3, Object Management Group, pp. 1–34, Nov. 1995.*

* cited by examiner

Primary Examiner—St. John Courtenay, III
(74) Attorney, Agent, or Firm—Staas & Halsey LLP

(57) ABSTRACT

After an incarnation being an object set at site B connected with an entity being an object set at site A by means of a communication link is disconnected with an entity at site A, the incarnation moves to site C. The incarnation updates network address information in the entry including said designated MAG identifier in a database held by a repository to network address information indicating site C. Then, the incarnation triggers the entity at site A, and the incarnation at site C and the entity at site A re-establish communication between the incarnation and the entity by referring to the repository from time to time.

14 Claims, 20 Drawing Sheets

```
SlotDescriptor open(String slotname)    (a) ─┐  A METHOD OF PROTOCOL FOR CONTROLLING A
                                             │  REFERENCE RELATION FOR AN OBSERVABLE 101
void close(SlotDescriptor desc)         (b) ─┘

Object read()                           (c) ─┐
                                             │  A METHOD OF PROTOCOL RELATING
void write(Object obj)                  (d) ─┤  TO A SLOT DESCRIPTOR
                                             │
boolean isModified()                    (e) ─┤
                                             │
TYPE INFORMATION type()                 (f) ─┘ void update()                           (g) ···  A METHOD OF PROTOCOL WITH DIRECTION FROM
                                                 AN OBSERVABLE 101 TO AN OBSERVER 102
```

F I G. 3

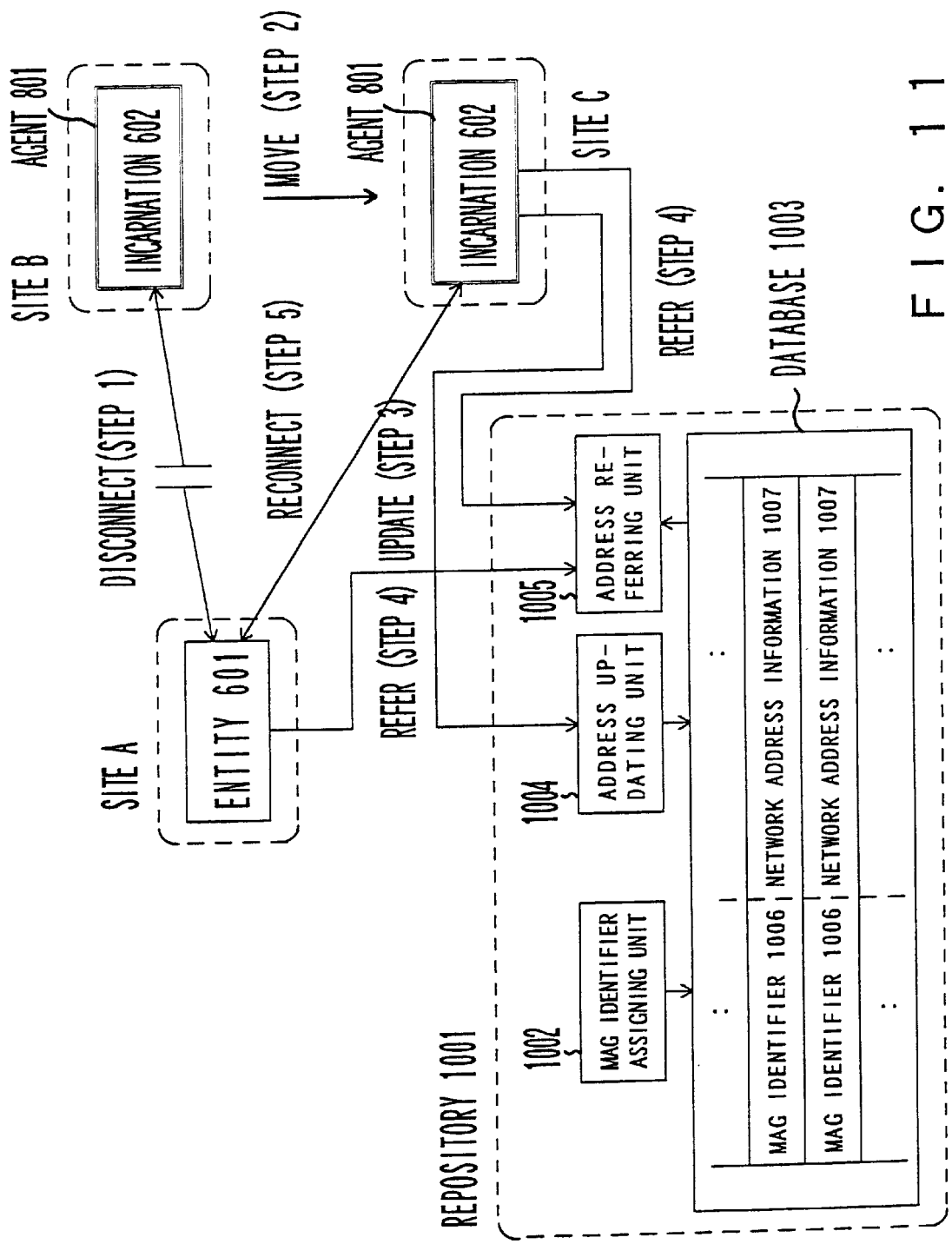
F I G. 1 1

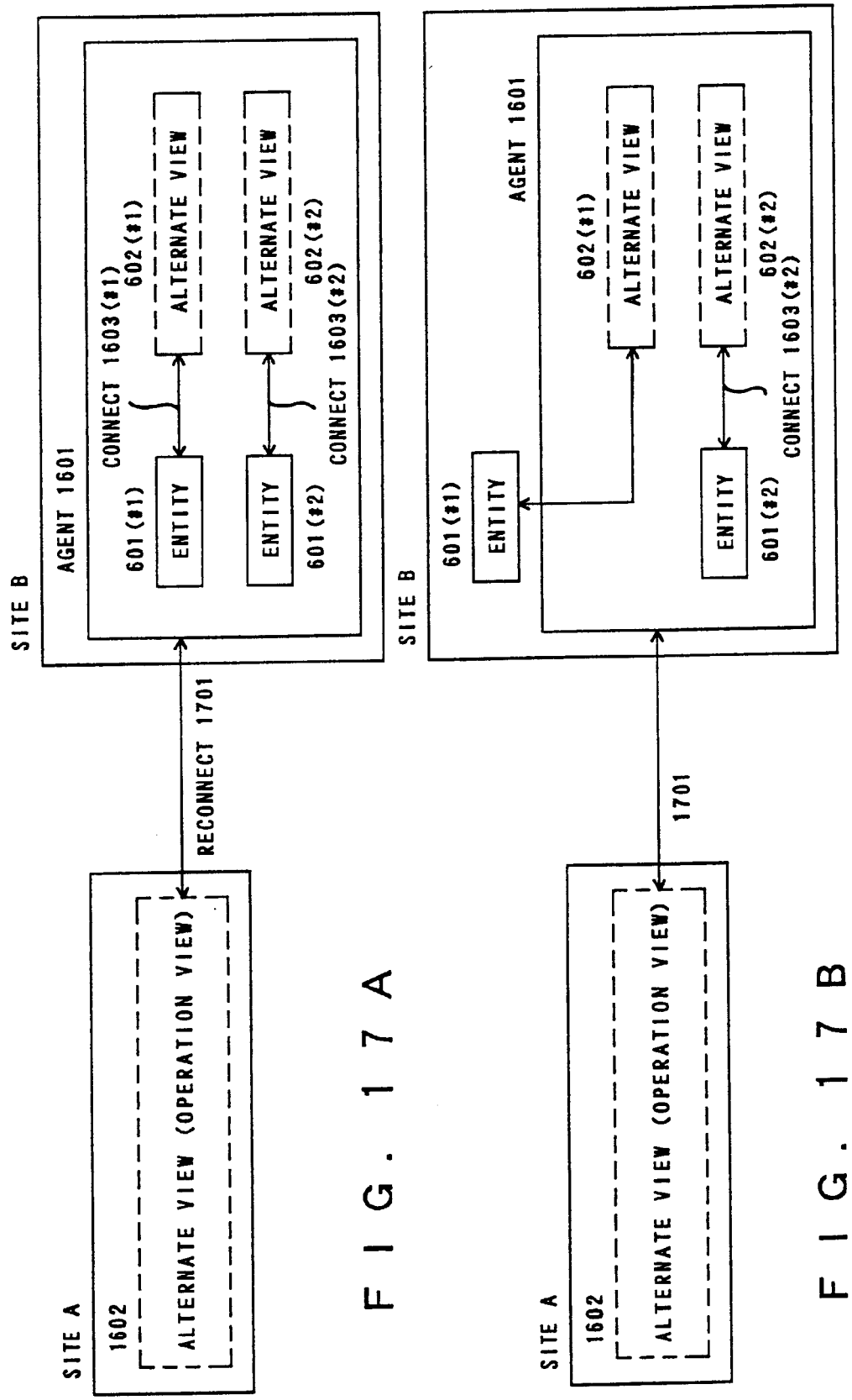

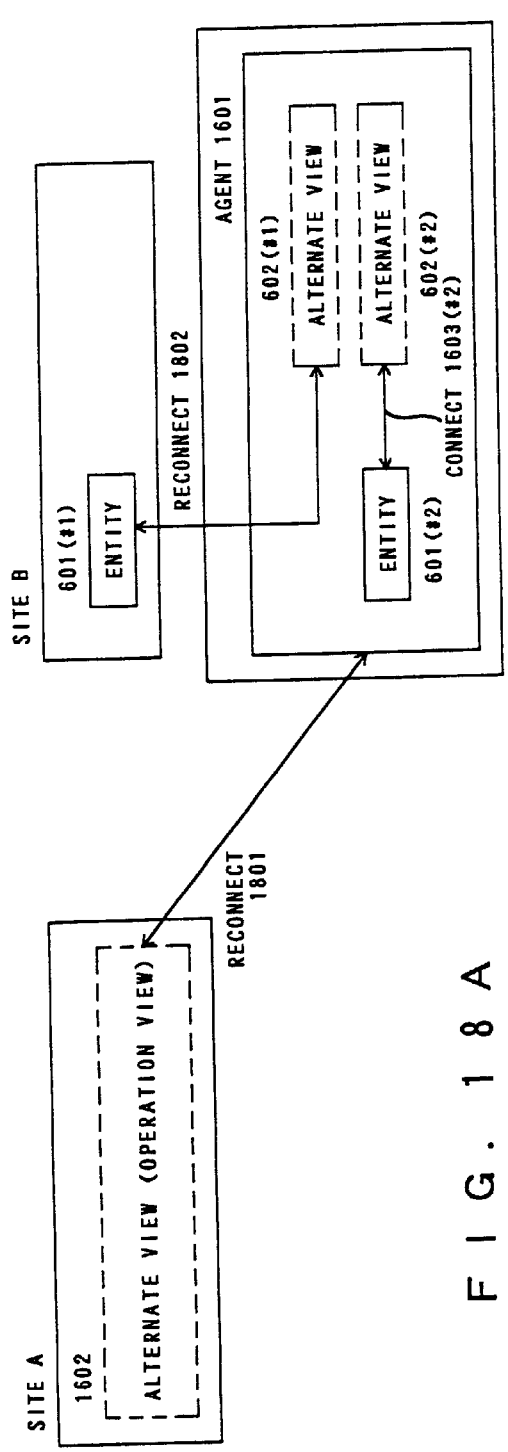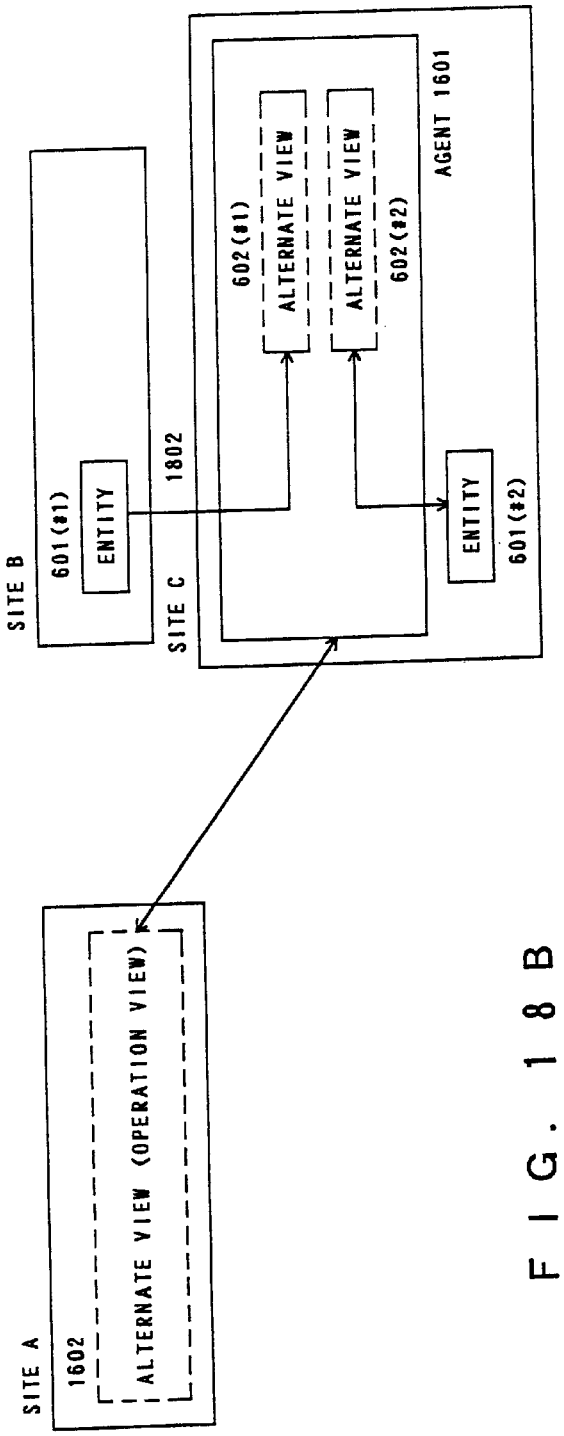
FIG. 18A
FIG. 18B

COMMUNICATION METHOD AND SYSTEM FOR OBJECTS MOVABLE IN NETWORK

BACKGROUND OF THE INVENTION

1. Field of the Invention

The present invention relates to an inter-object communication technique for realizing linkage between objects movable in a network.

2. Description of Related Art

As object-oriented programming has come into wide use recently, it is required to provide a technique for realizing flexible linkage of objects.

A well-known method for inter-object linkage, as a concrete example, is to utilize a development tool for window-based application software. Using this tool, users can easily develop application software having a graphical user interface (GUI) by making visual-arrangement combinations of such objects as window forms, buttons and list boxes, with a mouse or other device. In the development of application software, it is necessary to design the above mentioned objects so that each of them will interwork through mutual linkage. For this purpose, a technique for realizing flexible linkage of objects efficiently is required as an important part of software development.

Another known method for inter-object linkage, as a concrete example, is to embed server spreadsheet objects created with spreadsheet application software into client document objects created with word processor application software. In this case, it is also required to realize flexible linkage of objects.

For implementing inter-object linkage, there are such conventional techniques as OLE (Object Linking and Embedding) and OpenDoc. With these techniques, as in the example of linkage of document objects and spreadsheet objects mentioned above, an object of a server resource can be embedded into another object of a client.

However, the conventional techniques are disadvantageous in that a server resource embedded in one client cannot be embedded into another client at the same time.

Another disadvantage of the conventional techniques is that a client having another server resource embedded cannot be embedded as a server resource for another client.

A still further disadvantage of the conventional techniques is that information concerning "which server resource is to be embedded into which client" must be specified in source code instructions of a class for generating a client. That is, with the conventional techniques, the relationship between server resources and clients is predetermined statically and cannot be determined dynamically at the time of execution.

In addition, a recent trend toward mobile computing requires realization of inter-object linkage through networking. However, any efficient technique capable of providing consistency in inter-object linkage for mobile computing has not been known heretofore.

SUMMARY OF THE INVENTION

It is therefore an object of the present invention to provide flexible linkage of objects, and more particularly to provide flexible linkage of objects movable in a network.

A preferred embodiment of the present invention is based on the condition that inter-object communication is performed with a plurality of movable objects through networking.

First, in a network, a first computer generates a first MAG (entity 601) that is an object set comprising an observable object (observable 101) including an access procedure for providing direct access to data and a data access process relay function (net observer 401) for networking through the access procedure of the observable object.

Next, a second computer which is located in the network and is different from or identical to the first computer generates a second MAG (incarnation 602) that is an object set comprising a net observable object (net observable 402) including an access procedure for providing indirect networking access to data held by the observable object included in the first MAG and an observer object (observer 102) for providing networking access through the access procedure to data held by the observable object included in the first MAG.

Then, in the network, a repository (repository 1001) is provided which is a server for holding a data set including MAG identifiers (MAG identifiers 1006) indicating the first and second MAGs respectively, and network address information (network address information 1007) indicating addresses of networked sites having the first and second MAGs.

Then, for movement of the first or second MAG in the network, the first or second MAG is disconnected from the second or first MAG which it is in network communication with, and thereafter the first or second MAG is moved in the network.

Further, for the first or second MAG moved in the network, an associated MAG identifier thereof is specified, and thereby the network address information in the data set containing the specified MAG identifier held in the repository is updated to indicate a third computer where the first or second MAG moved in the network is present.

The first or second MAG moved in the network triggers the second or first MAG which is in network communication with, and according to the triggering, the first or second MAG moved in the network and the second or first MAG which it is in network communication with makes reference to the data set held in the associated repository as required, thereby re-establishing mutual communication connection.

In the above mentioned configuration of the present invention, for the first MAG in a computer in the network and the second MAG that has been moved to another computer in the network and makes reference to the first MAG, consistency in mutual connection before and after movement can be maintained by updating and referencing the data set containing the MAG identifiers and network address information in the repository.

In carrying out the present invention in a computer application, it is also possible to provide a computer-readable recording medium for letting a computer perform functions equivalent to those in the foregoing configuration of the invention.

BRIEF DESCRIPTION OF THE DRAWINGS

The above and other objects, features and advantages of the present invention will become more apparent to those skilled in the art from the following description of embodiments with reference to the accompanying drawings, in which:

FIG. 3 is an explanatory diagram showing methods related to observable-observer communication protocols;

FIG. 11 is a schematic diagram showing an agent movement process (1);

FIG. 17A is a schematic diagram of a process through which an agent 1601 is entered to site B in a distributed job execution system in the preferred embodiment of the invention;

FIG. 17B is a schematic diagram of a process through which an entity (601) (#1) is separated at site B in a distributed job execution system in the preferred embodiment of the invention;

FIG. 18A is a schematic diagram showing a process through which the agent 1601 is moved to site C in a distributed job execution system in the preferred embodiment of the invention;

FIG. 18B is a schematic diagram showing a process through which an entity 601 (#2) is separated at site C in a distributed job execution system in the preferred embodiment of the invention;

DETAILED DESCRIPTION OF THE PREFERRED EMBODIMENTS

The present invention will now be described in detail by way of example with reference to the accompanying drawings.

In the preferred embodiments of the invention, it is a major feature that objects movable in a network are implemented as agents capable of accessing a server computer called a repository.

Since various prerequisite techniques are used for providing the agents mentioned above in the preferred embodiments of the invention, the prerequisite techniques will be explained first and implementation of the objects movable in a network will then be described.

<Description of Observer and Observable Objects>

Figure 1:
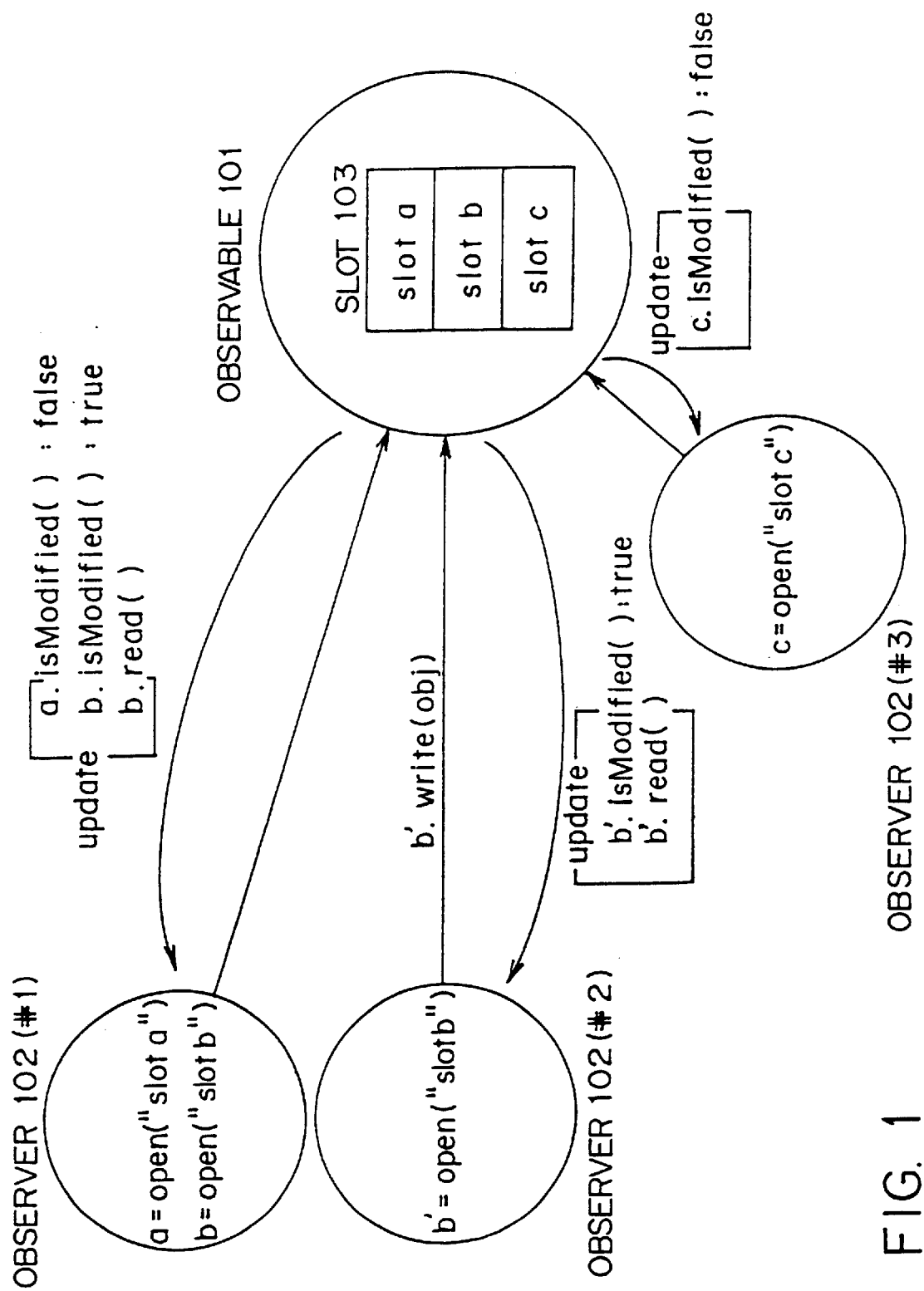
FIG. 1 is a schematic diagram showing observer and observable objects in a preferred embodiment of the invention.

Referring to FIG. 1, there is shown a scheme of observer and observable objects in a preferred embodiment of the invention.

In the present embodiment, an observable 101 and an observer 102 are used in a conceptual model of inter-object communication. The observable 101 and observer 102 are objects, and in the communication model, there is a relationship that the observer 102 makes reference (access) to the observable 101.

Reference to the observable 101 by the observer 102 in the present embodiment is carried out only through an interface called a slot 103 defined in the observable 101.

The slot 103 is an interface (e.g., a structure) held in the observable 101 for connection with the external observer 102, and the observable 101 is capable of holding a plurality of slots 103.

Figure 2:
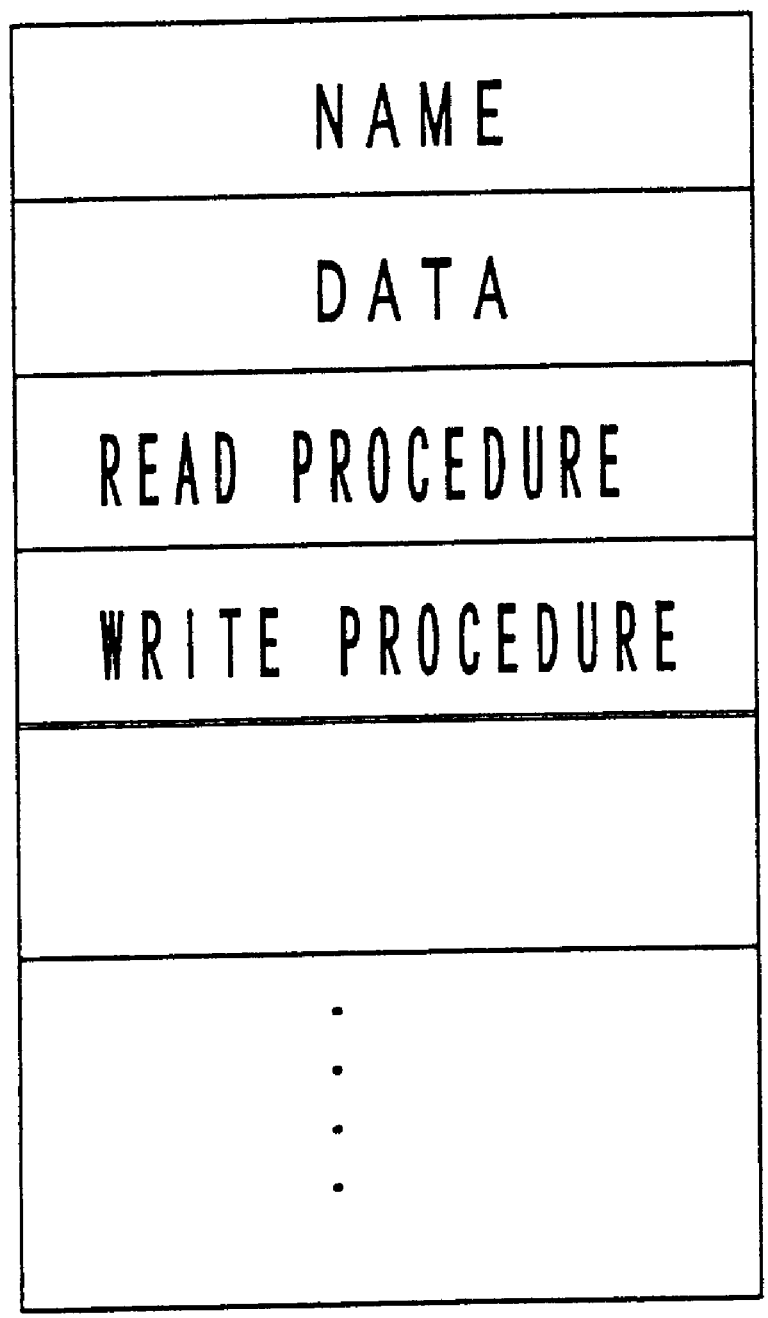
FIG. 2 is a slot structure diagram.

As shown in FIG. 2, the slot 103 comprises a "name", "data" of a particular type, "read procedure" code, and "write procedure" code. For each slot 103, it is allowed to define "read procedure" and "write procedure". By default, the "read procedure" performs reading of "data" and the "write procedure" performs substitution in "data".

The observer 102 opens the slot 103 of the observable 101 according to the "name" stored in the slot 103, and acquires a slot descriptor for identifying the slot 103. Then, by executing a read or write method for the slot descriptor, the observer 102 can invoke the "read procedure" or "write procedure" of the slot 103.

Therefore, it is not necessary to specify a relationship between the observer 102 and observable 101 in source code instructions of a class that defines the observer 102 and observable 101. At the time of execution, the relationship can be dynamically determined through specification of the "name" (slot descriptor).

In the present embodiment, when "data" of the observable 101 is changed, an event called "update" ("update" in FIG. 1) indicating a change is reported to the observer 102 referencing the observable 101. Thereby, the observer 102 can always know the latest state of the observable 101. This mechanism allows a plurality of observers 102 to make reference to one observable 101 at the same time. That is, it is possible to make an arrangement so that the "update" event corresponding to a change in "data" of the observable 101 is reported to all the observers 102 referencing the observable 101. Consequently, all the observers 102 referencing the observable 101 can maintain consistency in observation of the observable 101.

Referring to FIG. 3, there is shown an explanatory diagram of methods related to protocols for communication between the observable 101 and observer 102.

First, an open method shown at (a) in FIG. 3 and a close method shown at (b) in FIG. 3 are defined as protocol methods for controlling reference relation with the observable 101.

The open method shown at (a) in FIG. 3 declares that the observer 102 is to make reference to the slot 103 having a "name" (FIG. 2), e.g., "slotname" in the observable 101. Through the open method, a reference relationship of the observer 102 to the observable 101 is established. Note that the data type of "slotname" is "String" (character string) and a return value in the open method is a slot descriptor that has "SlotDescriptor" type. After successful execution of the open method, by using the returned slot descriptor from the execution, it is possible to access the corresponding "data" (FIG. 2) of the slot 103.

In the configuration shown in FIG. 1, the observable 101 has three slots 103 of "slota", "slotb" and "slotc". By carrying out the following two open methods, the observer 102 (#1) obtains slot descriptors a and b to set up a reference relationship between the slot 103 ("slota") and slot 103 ("slotb") of the observable 101.

a=open ("slota")

b=open ("slotb")

In the same manner, the observers 102 #2 and #3 carry out each of the following open methods to obtain slot descriptors b' and c, establishing a reference relationship of the observable 101 to the slot 103 ("slotb") and slot 103 ("slotc").

b'=open ("slotb")

c=open ("slotc")

Then, the close method shown at (b) in FIG. 3 declares that the observer 102 is to terminate reference to a particular slot 103 of the observable 101. The particular slot 103 for the observer 102 is assigned as an argument in the above mentioned close method and identified by a slot descriptor "desc" having "SlotDescriptor" type. In the close method, when there remains no slot 103 of the observable 101 which is opened by the observer 102, the reference relationship to the observable 101 is made to disappear. Note that a return value in the close method is of the "void" type (indicating that a useful value is not returned).

Thereafter, as protocol methods related with the slot descriptors obtained in the open method mentioned above, the following methods are defined; a read method shown at (c) in FIG. 3, a write method shown at (d) in FIG. 3, an isModified method shown at (e) in FIG. 3, and a type method shown at (f) in FIG. 3.

The read method shown at (c) in FIG. 3 carries out the "read procedure" (FIG. 2) in a particular slot 103 of a particular observable 101 which is identified by a slot descriptor "desc" assigned as desc.read( ). Read data is given back as a return value of the read method, and a type thereof is the same type ("Object" type) as that of "data" (FIG. 2) in the slot 103.

In the configuration shown in FIG. 1, on occurrence of an update event, to be described later, the observers 102 #1 and #2 carry out each of the following read methods for the slot 103 ("slotb") in the observable 101 to read out "data" from the slot 103 ("slotb").

b.read( )

b'.read( )

The write method shown at (d) in FIG. 3 carries out the "write procedure" (FIG. 2) in a particular slot 103 of a particular observable 101 which is identified by a slot descriptor "desc" assigned as desc.write( ). Data of a write object is assigned as an argument only in the write method, and a type thereof is the same type ("Object" type) as that of "data" (FIG. 2) in the slot 103.

In the configuration shown in FIG. 1, the observer 102 #2 carries out the following write method for the slot 103 ("slotb") in the observable 101 to write data "obj" into "data" area in the slot 103 ("slotb").

b'.write(obj)

The isModified method shown at (e) in FIG. 3 carries out an "isModified procedure" (not shown in the drawing) in a particular slot 103 of a particular observable 101 which is identified by a slot descriptor "desc" assigned as desc.isModified( ). This procedure returns a boolean value "true" if "data" in the slot 103 has been changed or a boolean value "false" if "data" in the slot 103 has not been changed.

In the configuration shown in FIG. 1, on occurrence of an update event to be described later, the observers 102 #1, #2 and #3 carry out each of the following isModified methods for each slot 103 in the observable 101 to check whether "data" in each slot 103 has been changed or not.

a.isModified( )

b.isModified( )

b'.isModified( )

c.isModified( )

Upon occurrence of an update event, each observer 102 carries out the isModified method, thereby making it possible to maintain consistency in observation of the observable 101.

The type method shown at (f) in FIG. 3 carries out "type procedure" (not shown in the drawing) in a particular slot 103 of a particular observable 101 which is identified by a slot descriptor "desc" assigned as desc.type( ). This procedure returns type information of "data" in the slot 103. Prior to issuance of the read or write method, the observer 102 can obtain the type information of "data" in the slot 103 of the observable 101.

Lastly, the update method shown at (g) in FIG. 3 is defined as a protocol method for indicating a direction from the observable 101 to the observer 102. The update method is described in source code instructions including the observable 101. When the "write procedure" is executed on "data" in any slot 103 of the observable 101, an update event is issued to all the observers 102 connected with the observable 101 to indicate a change (modification) in the "data".

In the scheme shown in FIG. 1, if the observer 102 #2 carries out the method "b'.write(obj)" on the slot 103 ("slotb") in the observable 101, for instance, data "obj" is written into the "data" area in the slot 103 ("slotb"). Then, by executing the update method, the observable 101 issues an update event to each of the observers 102 #1, #2 and #3 connected therewith.

Upon receiving the update event, the observer 102 #1 carries out the methods "a.isModified( )" and "b.isModified( )" on the slots 103 ("slota") and ("slotb") respectively in the observable 101 which are currently opened by the observer 102 #1. Thus, it is detected that "data" in the slot 103 ("slotb") has been changed. The observer 102 #1 then carries out the "b.read( ))" method on the slot 103 ("slotb") in the observable 101 to read out the "data" that has been changed.

In the same fashion, upon receiving the update event, the observer 102 #2 carries out the "b'.isModified( )" method on the slot 103 ("slotb") in the observable 101 which is currently opened by the observer 102 #2. Thus, it is detected that "data" in the slot 103 ("slotb") has been changed. The observer 102 #2 then carries out the "b'.read( )" method on the slot 103 ("slotb") in the observable 101 to read out the "data" that has been changed.

Further, upon receiving the update event, the observer 102 #3 carries out the "c.isModified( )" method on the slot 103 ("slotc") in the observable 101 which is currently opened by the observer 102 #3. Thus, it is detected that "data" in the slot 103 ("slotc") has not been changed.

In addition to the protocol methods for communication with the observable 101, the observer 102 can have various methods for functions implemented by the observer 102. For instance, where the observer 102 provides GUI window objects, it is possible for the observer 102 to include methods for processing events issued by the window objects, methods for screen drawing, etc.

<Observer-to-Observable Communication through Networking>

Figure 4:
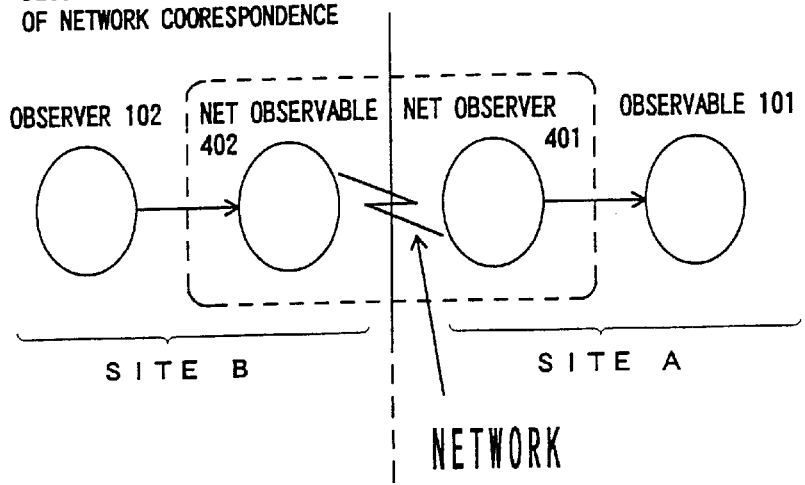
FIG. 4 is a schematic diagram showing a networking arrangement in a preferred embodiment of the invention.

Referring to FIG. 4, there is shown a scheme where the observable 101 is referenced by the observer 102 through networking in a preferred embodiment of the invention.

In the networking of the present preferred embodiment, a pair of net observer 401 and net observable 402 is generated as an observer-observable combination for the relay of communication of objects between networked sites as shown in FIG. 4(a).

The observable 101 at site A specifies an address (e.g., IP address) of a computer at site B holding the observer 102 which is to make reference to the observable 101, and the observable 101 issues an instruction for generating a pair of net observer 401 and observable 402. At this step, it is allowed to specify a plurality of sites B holding observers 102.

As a result, in a computer at site A, a net observer 401 is generated which has a function for referencing the observable 101 and a function for executing network communication with the net observable 402 using a socket interface, for example.

Then, the site-A computer issues a request for generation of net observable 402 to the site-B computer holding the observer 102 which is to make reference to the observable 101. As a result, in the site-B computer, a net observable 402 is generated which has a function for processing reference by the observer 102 and a function for executing the above mentioned network communication with the net observer 401 at site A. At this step, if there are plural sites B holding observers 102 which are to make reference to the observable 101 at site A, the site-A computer generates a plurality of net observers 401. That is, in this case, plural net observers 401 for referencing one observable 101 are generated by the site-A computer.

One slot 103 (slot group 103) in the observable 101 at site A corresponds to one slot 103 (slot group 103) in the net observable 402 which has been generated at site B.

When the observer 102 at site B makes reference to "data" (FIG. 2) in a particular slot 103 of the observable 101 at site A, the observer 102 opens the slot 103 identical to the above mentioned particular slot 103 in the net observable 402 at site B according to a "name" thereof (FIG. 2). (Refer to FIG. 3(a).) Then, using a slot descriptor obtained as a result, the observer 102 carries out the read method or write method, etc. of various methods (FIG. 3(c) to (f)).

Consequently, a particular procedure in the particular slot 103 of the net observable 402 at site B is invoked so that the access information by the observer 102 at site B is relayed to the net observer 401 at site A. As a network communication scheme in this case, for instance, socket interfacing which is one of inter-process communication techniques may be employed.

Upon receiving the access information by the observer 102 at site B from the net observable 402 at site B, the net observer 401 at site A opens the particular slot 103 of the observable 101 at site A, converts the access information to a relevant method for the slot 103, and carries out the method.

Thus, "data" in the observable 101 at site A is referenced, and the result is returned to the net observer 401 at site A.

Upon receiving this result, the net observer 401 at site A relays it to the net observable 402 at site B.

When the net observable 402 at site B receives the access result from the net observer 401 at site A, the net observable returns it to the procedure process through which the access information by the observer 102 at site B has been relayed.

Then, the procedure process returns the access result to the site-B observer 102 which has invoked it.

As described above, when the observer 102 at site B makes reference to "data" (FIG. 2) in the slot 103 of the observable 101 at site A, the reference operation can be accomplished just by changing a specified object from the observable 101 at site A to the net observable 402 at site B without being conscious of networking.

Referring to FIG. 4(b), there is shown an example of coding of net observer 401 and net observable 402. This example presents a part which processes the write method to be issued from the observer 102 at site B to the observable 101 at site A.

First, the net observer 401 at site A, at startup thereof, invokes a receiving daemon process which contains the standardized coding shown at the right side in FIG. 4(b), for example. This receiving daemon process supervises and handles information to be relayed from the net observable 402 at site B. On the other hand, the net observable 402 at site B, at startup thereof, invokes a receiving daemon process which contains the standardized coding shown at the left side in FIG. 4(b). This receiving daemon process supervises and handles information to be relayed from the net observer 401 at site A.

In the coding of each procedure for each slot 103 in the net observable 402 at site B, the code, for relaying the access information by the observer 102 at site B to the net observer 401 at site A, is added. In FIG. 4(b), #9 to #12 indicate standardized codes for "write procedure" (FIG. 2) in one slot 103 of the net observable 402 at site B.

For instance, after opening one slot 103 in the net observable 402 at site B (FIG. 3(a)), the observer 102 at site B carries out the write method (FIG. 3(d)) on the slot 103.

As a result, the "write procedure" code block in the slot 103 of the net observable 402 at site B is carried out, which is shown at #9 to #12 in FIG. 4(b). For circumventing an occurrence of a deadlock, it is desirable to make an arrangement so that individual code blocks are executed as independent threads.

Thus, a write instruction indicated at #10 is called into execution. In the execution of the write instruction, the access information by the observer 102 at site B <write identifier, name, obj, waitId>, which is given as the second argument in the write instruction, is relayed to the net observer 401 at site A. The "write identifier" is used to indicate that the observer 102 at site B has issued the write method. As a "name", the "name" of the slot 103 (FIG. 2) containing the above mentioned write instruction is specified. The argument "obj" represents object data that is specified as an argument in the write method issued by the observer 102 at site B. The argument "waitId" is used for controlling a wait instruction, to be described later. The first argument "soc" in the write instruction is a socket descriptor for identifying a socket connection through networking.

After execution of the write instruction indicated at #10, the wait instruction indicated at #11 puts execution threads for the code blocks in a sleep state. The sleep state is released when a post-instruction indicating that an answer to the write instruction has been received from the net observer 401 at site A is received from the receiving daemon process in the net observable 402 at site B. If the wait instruction augment "waitId" matches the post instruction argument "waitId", an execution thread for the wait instruction is released from the sleep state. Thereby, a plurality of procedures can be controlled in parallel.

The receiving daemon process of the net observer 401 at site A supervises issuance of a command from the net observable 402 at site B. More specifically, in an infinite loop of "for" block at #13 to #19 in the receiving daemon process shown in FIG. 4(b), access information relayed from the net observable 402 at site B is read as a list <command identifier, name, obj, waitId> by a read(soc) statement at #14. The argument "soc" is given as a socket descriptor. Thus, in execution of the read(soc) statement, the access information <write identifier, name, obj, waitId> of the write instruction from the net observable 402 at site B is received.

Then, a switch block at #15 to #18 is carried out for case selection with the "command identifier" in the received access information, and according to the result of the execution of the switch block, a case block corresponding to the received command identifier is carried out. In this example, since the "write identifier" is specified as a command identifier, a case block beginning with #16 is carried out. For circumventing an occurrence of a deadlock, it is desirable to code the case block so that it is executed as an independent thread.

In execution of the case block mentioned above, a particular slot 103 in the observable 101 at site A corresponding to the "name" contained in the access information is obtained (more specifically, a slot descriptor obtained by the open method executed for the slot 103 is acquired), and the write method for the slot 103 is invoked using the argument "obj" in the access information.

As a result, the "write procedure" (FIG. 2) in the particular slot 103 of the observable 101 of site A is executed.

Thereafter, in the above mentioned case block, a write instruction at #17 is executed. As a result, answer information <END identifier, waitId> given as the second argument in the write instruction is relayed to the net observable 402 at site B. The "END identifier" is used to indicate completion of issuance of the write method for the observable 101 at site A. The argument "waitId" is equal to "waitId" received by the instruction at #14. The argument "soc" is a socket descriptor.

The receiving daemon process in the net observable 402 at site B supervises issuance of a command from the net observer 401 at site A. More specifically, in an infinite loop of "for" block at #1 to #8 in the receiving daemon process shown in FIG. 4(*b*), answer information relayed from the net observer 401 at site A is read by a read(soc) statement at #2. The argument "soc" is given as a socket descriptor. Thus, in the execution of the read(soc) statement, the answer information <END identifier, waitId> of the write instruction from the net observer 401 at site A is received.

Then, a switch block at #3 to #7 is carried out for execution of a case block corresponding to the received identifier. In this example, since the "END identifier" is received, a case block beginning with #4 is carried out.

In execution of the case block mentioned above, a post instruction is executed with the received argument "waitId". As a result, the thread for which the wait instruction with the same argument "waitId" has been executed is released from the sleep state, and an answer is returned to the side-B observer 102 that has carried out the write method.

In the above sequence, a reference operation by the observer (including the net observer 401) to the observable (including the net observable 402) is performed using a "name" of the slot 103 held in the observable. Therefore, when the observer 102 at site B makes reference to the observable 101 at site A, the reference operation can be accomplished just by specifying a "name" of the slot 103 in the site-B net observable 402 corresponding to the site-A observable 101 without being conscious of the networking.

<Description of MAG, Entity and Incarnation>

The following explains the concepts of MAG, incarnation, and entity used in the preferred embodiments of the invention.

Figure 5:
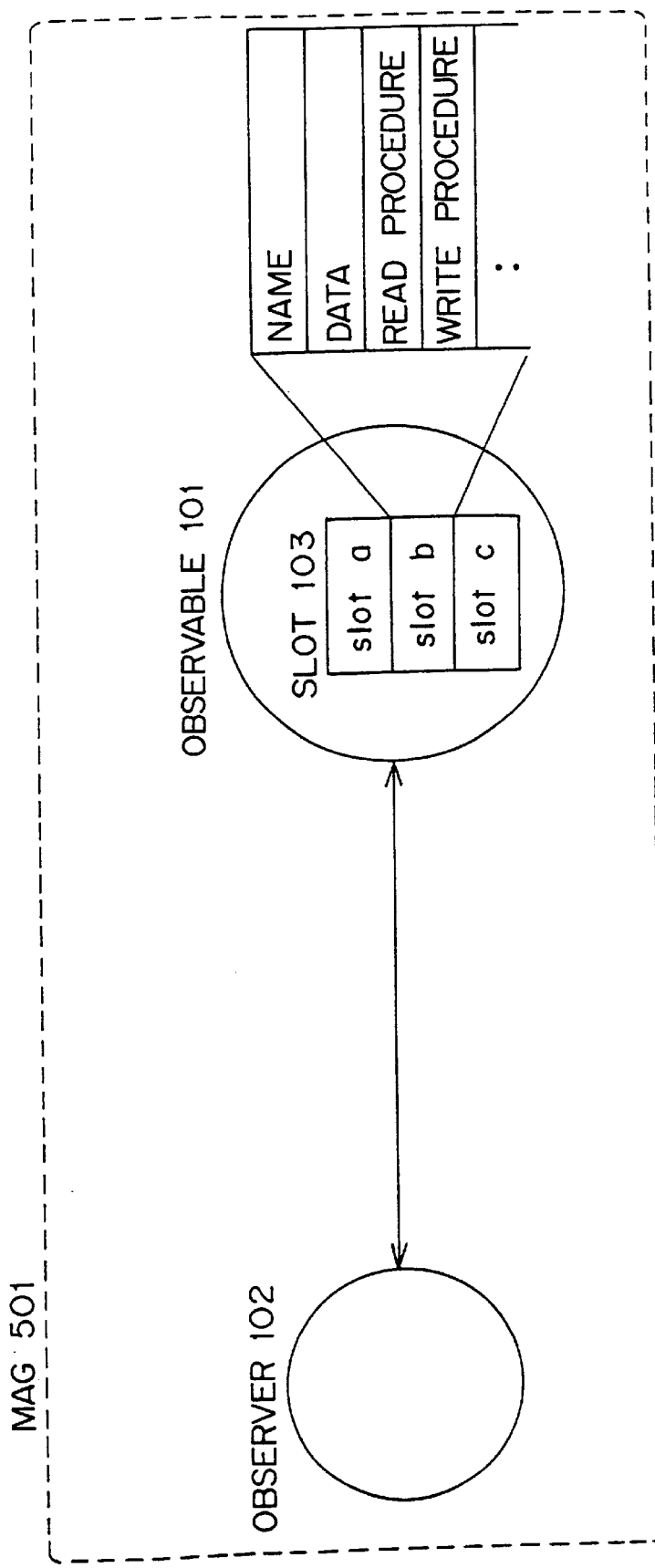
FIG. 5 is a schematic diagram of a MAG.

Referring to FIG. 5, a MAG 501 generally means a object set which comprises an object containing an access procedure capable of providing direct or indirect access to "data" (observable 101 shown in FIG. 1 or net observable 402 shown in FIG. 1) and at least one object for carrying out a particular process by referencing the "data" through the access procedure (observer 102 shown in FIG. 1 or net observer 401 shown in FIG. 4). In a special case, the MAG 501 may comprise only one of observer 102, net observable 402 and observable 101.

Figure 6:
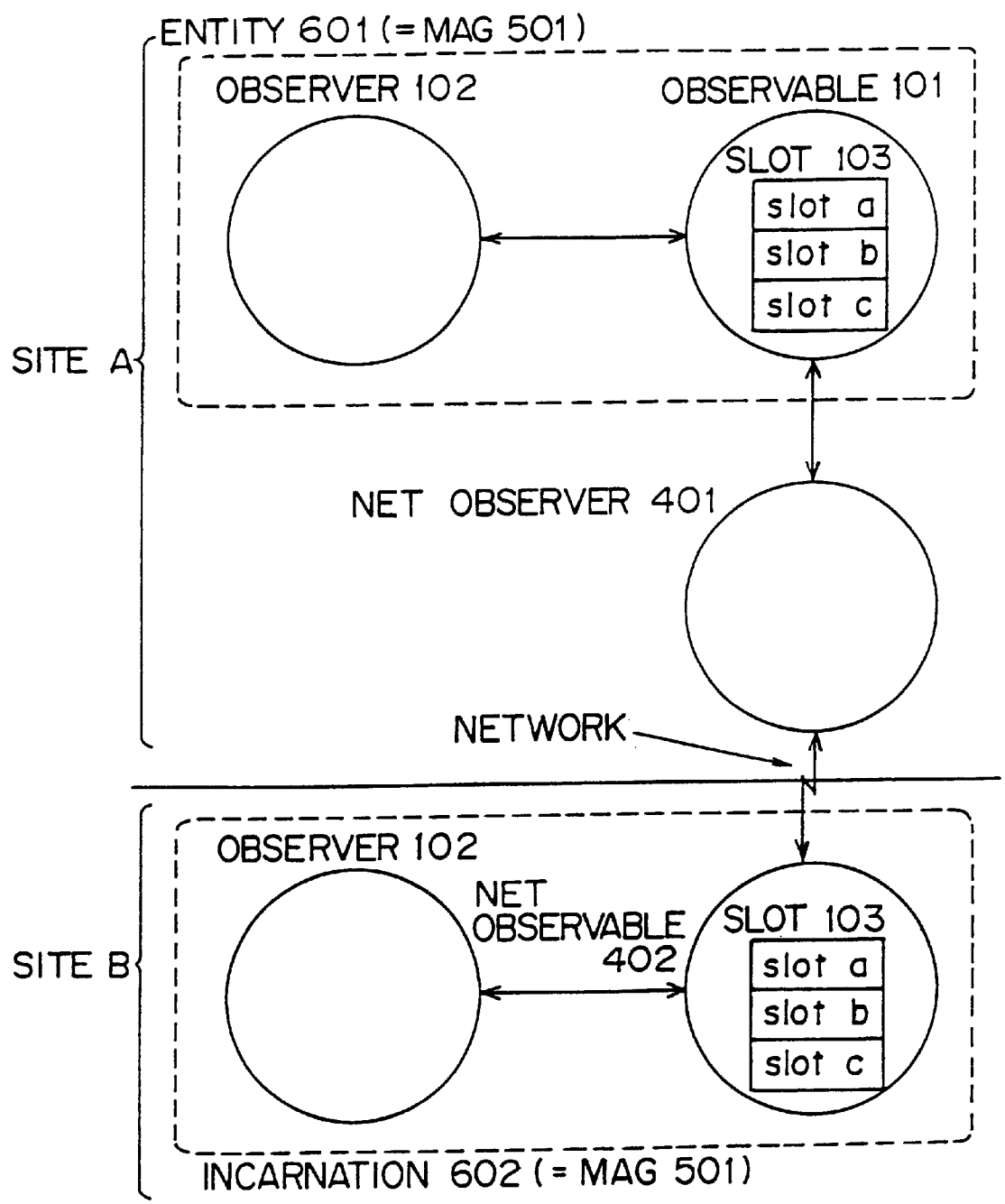
FIG. 6 is a schematic diagram showing an entity and incarnation.

Referring now to FIG. 6, there is shown a scheme where two MAGs are provided. In this scheme, a second MAG 501 which contains the net observable 402 having a procedure for accessing the whole or a part of "data" held in the observable 101 included in a first MAG 501 is called an incarnation 602 of the first MAG 501. The first MAG 501 is called an entity 601. The net observable 402 in the incarnation 602 existing at networked site B communicates with the observable 101 in the entity 601 at networked site A through the net observer 401 thereof. In other words, the entity 601 is equivalent to the MAG 501 which implements a desired application, and the incarnation 602 is equivalent to the MAG 501 which makes reference to the application through networking. In some cases, there may be a plurality of incarnations 602 corresponding to one entity 601. With the update event mechanism mentioned above (FIG. 1), however, the observer 102 in each incarnation 602 making reference to the observable 101 in one entity 601 is capable of maintaining consistency in observation of the observable 101 in the entity 601.

In the preferred embodiment of the invention, three kinds of incarnations 602 are provided.

A first incarnation 602 is called an alternative view, which comprises the net observable 402 and the observer 102 (default observer) having an interface only for accessing "data" held in the slot 103 of the observable 101 in the entity 601 corresponding to the incarnation 602.

The interface possessed by the observer 102 includes the following; code blocks such as a read method, write method, type method, etc. for accessing "read procedure" code, "write procedure" code, or "type procedure" code defined in the slot 103 of the net observable 402 corresponding to each slot 103 of the observable 101 in the entity 601 (FIG. 3), a code for receiving the update event reported to the observer 102 in the incarnation 602 from the update method defined in the observable 101 of the entity 601 through the update method defined in the net observable 402 of the incarnation 602, etc.

The default observer 102 in the alternate view does not have any application functions other than the above mentioned interface functions.

The alternate view will be explained in further detail later in description of a distributed job execution system in a preferred embodiment of the invention.

A second incarnation 602 is called a model share, which comprises the net observable 402 and the observer 102 that is a copy of the observer 102 in the entity 601 corresponding to the incarnation 602.

A third incarnation 602 is called a viewpoint, which comprises the interface functions included in the alternate view and additional functions for display and event processing.

Figure 7:
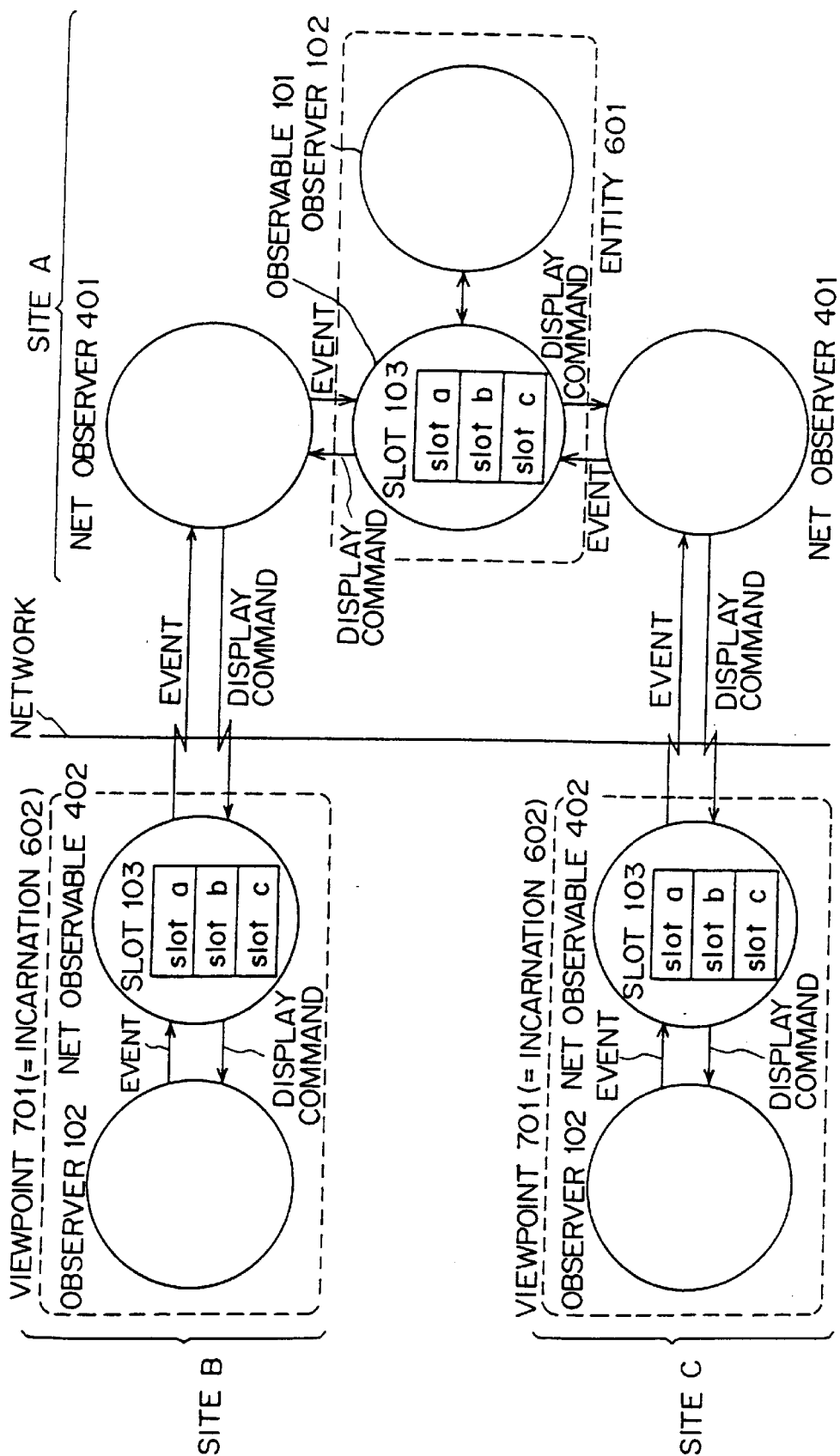
FIG. 7 is a schematic diagram of a viewpoint.

For instance, as shown in FIG. 7, the observable 101 and observer 102 in the entity 601 at site A are provided as applications having GUIs for spreadsheet processing.

The viewpoint 701 being an incarnation 602 at site B comprises a network observable 402 having a slot 103 corresponding to each slot 103 of the observable 101 in the entity 601, and an observer 102 being a screen object.

When an event is generated by a mouse operation, etc. on a computer screen at site B, the event is relayed to a first net observer 401 at site A through networking by the access procedure defined in the particular slot 103 in the net observable 402, and further the event is processed by the observer 102 through the access procedure defined in the particular slot 103 having the same "name" as the particular slot 103 contained in the observable 101 in the entity 601.

When, as a result, a display instruction of a particular "data" is issued in the observable 101 in the entity 601, the display instruction is relayed from a first net observer 401 at site A to the net observable 402 in the viewpoint 701 at site B through networking, and further the display instruction is relayed to the observer 102 in the viewpoint 701 by the net observable 402. The observer 102 carries out screen displaying according to this display instruction.

As shown in FIG. 7, the viewpoint 701 for accessing the observable 101 in the entity 601 at site A can be generated, for example, at site C other than site B.

Each viewpoint 701 at site B and site C can be provided with the screen control of an application for implementing the entity 601 at site A in a form matching the environment of each site. In this case, with the update event mechanism mentioned above (see FIG. 1) the observer 102 in each viewpoint 701 referring to the observable 101 in the entity 601 can maintain consistency in the screen control of the observable 101 in the entity 601.

<Realization of objects movable in a network by agent>

A technique for realizing an object movable in a network based on the prerequisite techniques described above is described below.

In this preferred embodiment of the invention, as mentioned above, it is presumed that inter-object communication through networking can be implemented in units of an entity 601 and an incarnation 602 being a MAG 501 composing an object set. On this assumption, in this preferred embodiment of the invention, two cases are allowed for a case where a MAG 501 moves in a network. That is, one is a case where an incarnation 602 being a MAG 501 moves, as shown in FIG. 8, and the other is a case where an entity 601 being a MAG 501 moves as shown in FIG. 9.

Figure 8:
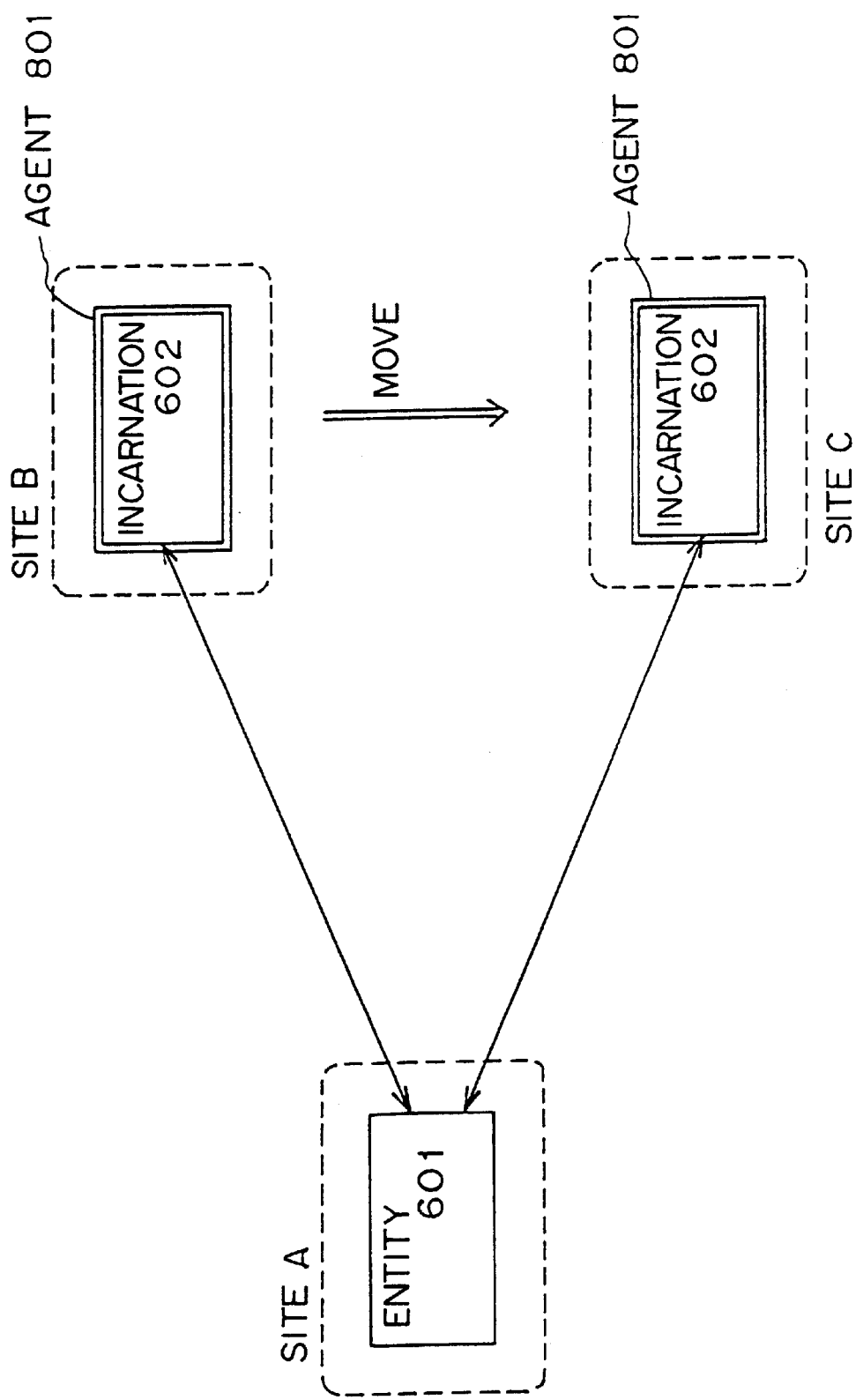
FIG. 8 is a schematic diagram (1) of an agent.
Figure 9:
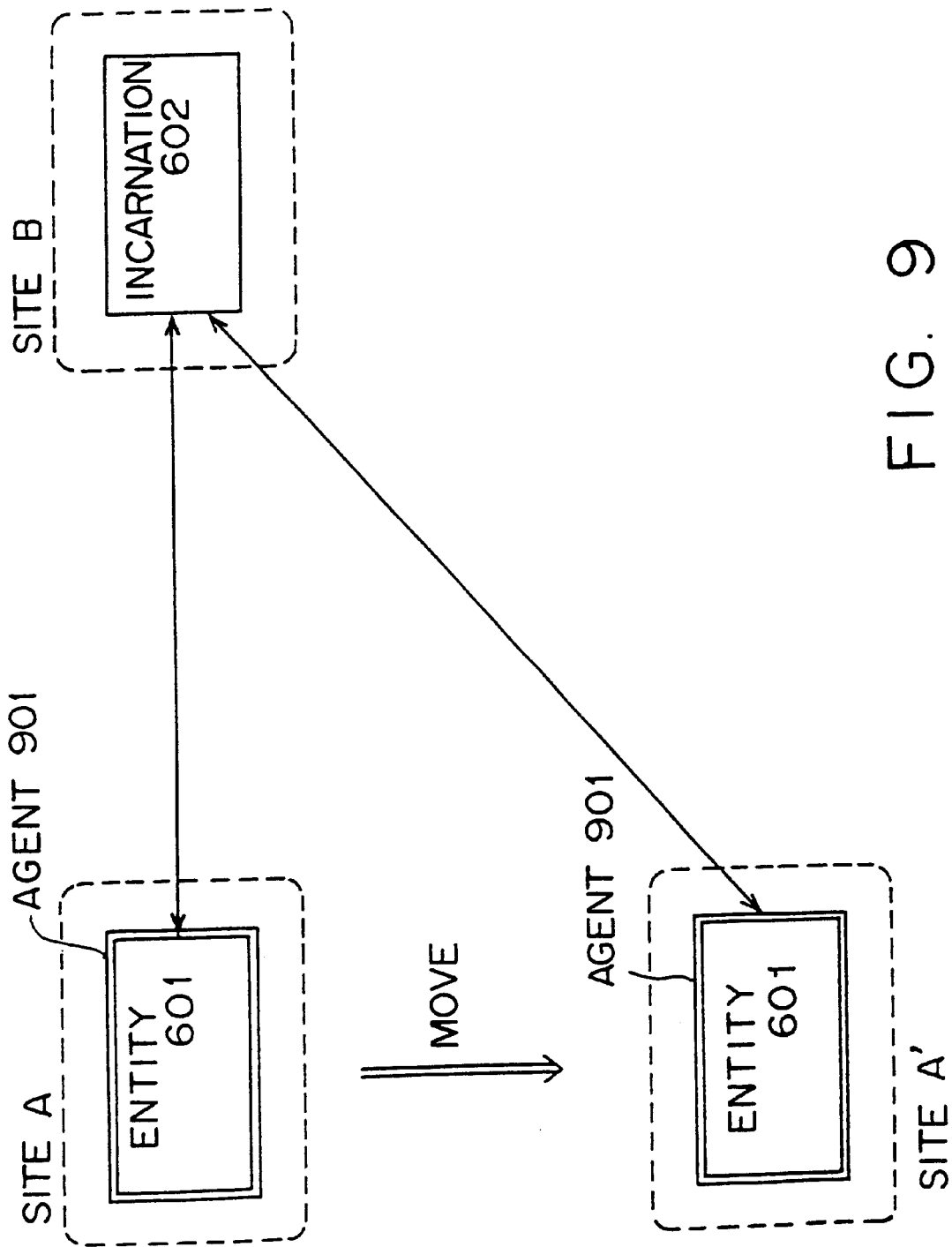
FIG. 9 is a schematic diagram (2) of an agent.

That is, in the case of FIG. 8, the incarnation 602 generated at site B corresponding to the entity 601 at site A can move to site C together with an agent 801 being an object block including the incarnation 602, and the incarnation 602 which has moved to site C together with the entity 601 at site A can maintain consistency in those connections before and after movement. Conversely, in the case of FIG. 9, the entity 601 at site A referenced by the incarnation 602 at site B can move to site A' together with an agent 901 being an object block including the entity 601, and the entity 601 which has moved to site A' and the incarnation 602 at site B can maintain consistency in those connections before and after movement.

To implement this function in this preferred embodiment of the invention, a server computer called a repository for managing information on the movement of the entity 601 and incarnation 602 in the network is installed in the network.

Figure 10:
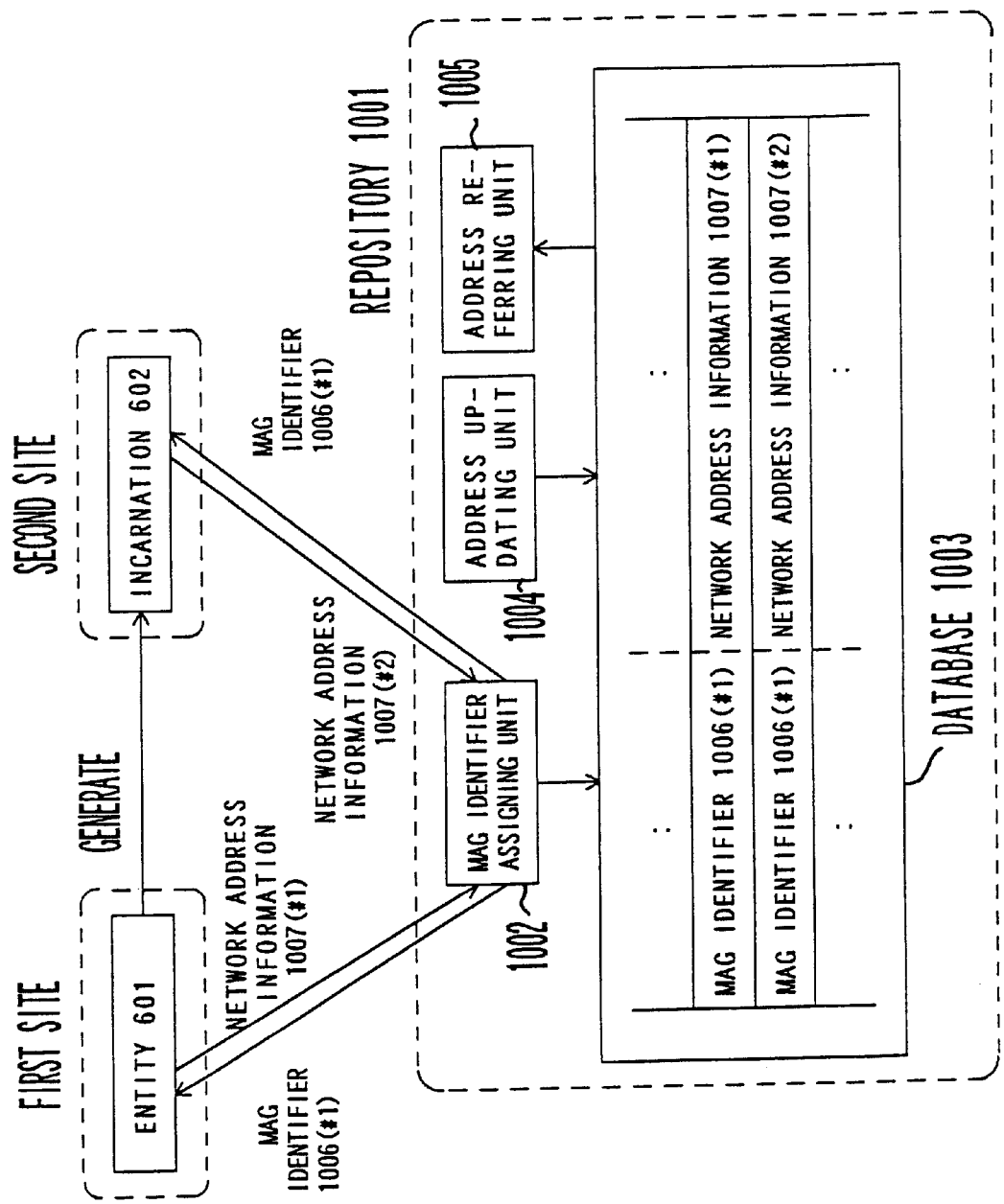
FIG. 10 is a schematic diagram of a repository.

As shown in FIG. 10, when an entity 601 at a first site generates an incarnation 602 corresponding to the above-mentioned entity 601 at a second site (it can also be the first site), the entity 601 at the first site and the incarnation 602 at the second site register network address information 1007 (#1) and 1007 (#2) at the first and second sites, respectively, in a repository 1001. The network address information 1007 is, for example, a host name or IP address.

A MAG identifier assigning unit 1002 in the repository 1001 assigns unique MAG identifiers 1006 (#1) and 1006 (#2) to the network address information 1007 (#1) and 1007 (#2), respectively, in the managing range of the repository 1001, registers those combinations in an entry of a database 1003 possessed by the repository 1001, and reports the above-mentioned two MAG identifiers 1006 (#1) and (#2) to the entity 601 at the first site and the incarnation 602 respectively, at the second site.

The entity 601 at the first site and the incarnation 602 at the second site hold both the MAG identifiers 1006 (#1) and (#2) of itself and the communicating party (the incarnation 602 at the second site and the entity 601 at the first site), and establishes an interconnection (e.g., the above mentioned connection by socket interfacing) using the MAG identifiers, and then starts inter-communication.

FIG. 11 explains the moving process of an agent 801 using a repository 1001, which corresponds to FIG. 8.

In an initial state, where an entity 601 exists at site A, and an incarnation 602, corresponding to the entity 601, exist at site B, an entry comprising a MAG identifier and network address information 1007 corresponding to the entity 601 at site A, and an entry comprising a MAG identifier 1006 and network address information 1007 corresponding to the incarnation at site B, are registered in a database 1003 of the repository 1001.

After an agent 801 at site B disconnects an interface (e.g., socket interfacing) between the incarnation 602 including the agent 801 and the entity 601 at site A corresponding to the incarnation 602 (step 1 in FIG. 11), the agent 801 at site B moves to site C being an address in the network (Step 2 in FIG. 11). The movement of the agent 801 includes a type in which the agent 801 is transmitted from site B to site C, or a type in which a mobile computer including the agent 801 moves from site B to site C, etc.

After the agent 801 has moved to site C, the agent 801 reports the network address information 1007 at the site C to the repository 1001 together with ea MAG identifier 1006 corresponding to the incarnation 602 included in the agent 801. An address updating unit 1004 in the repository 1001 retrieves an entry corresponding to the MAG identifier 1006 reported from site C from a database 1003, and updates the network address information 1007 in the retrieved entry to the network address information reported from site C (step 3 in FIG. 11).

Then, the incarnation 602 in the agent 801 which has moved to site C acquires the network address information 1007 of site A where the entity 601 exists, from the repository 1001 (step 4 in FIG. 11), and transmits a reconnection request for the incarnation 602 and the entity 601, to the entity 601 at site A using the network address information. On the other hand, the entity 601 at site A acquires the network address information 1007 of site C where the incarnation 602 has moved to, from the repository 1001 (step 4 in FIG. 11), and reconnects itself with the incarnation 602 which has moved to site C using the network address information (step 5 in FIG. 11).

When the incarnation 602 which has moved to site C or the entity 601 at site A acquires the network address information 1007 of site A or the network address information 1007 of site C, from the repository 1001, the incarnation 602 or the entity 601 reports the MAG identifier 1006 of the entity 601 or the MAG identifier 1006 of the incarnation 602 being a communicating party of the incarnation 602 or the entity 601 to the repository 1001, respectively, by referring to the MAG identifier 1006 of the entity 601 or the MAG identifier 1006 of the incarnation 602. On the other hand, an address referencing unit 1005 in the repository 1001 retrieves an entry corresponding to the MAG identifier 1006 of the reported entity 601 or the MAG identifier 1006 of the incarnation 602, and transmits the network address information 1007 in the retrieved entry to the incarnation 602 or the entity 601 in return.

In this way, when the incarnation 602 moves as shown in FIG. 8, the entity 601 at site A and the incarnation 602 which has moved to site C can maintain consistency in the connections before and after movement by updating and referring to the database 1003 in the repository 1001 as shown in FIG. 11. Since the database 1003 in the repository 1001 always holds the latest network address information 1007 for the entity 601 and the incarnation 602, such a situation that a moved entity 601 or incarnation 602 may be lost in the network can be avoided.

Figure 12:
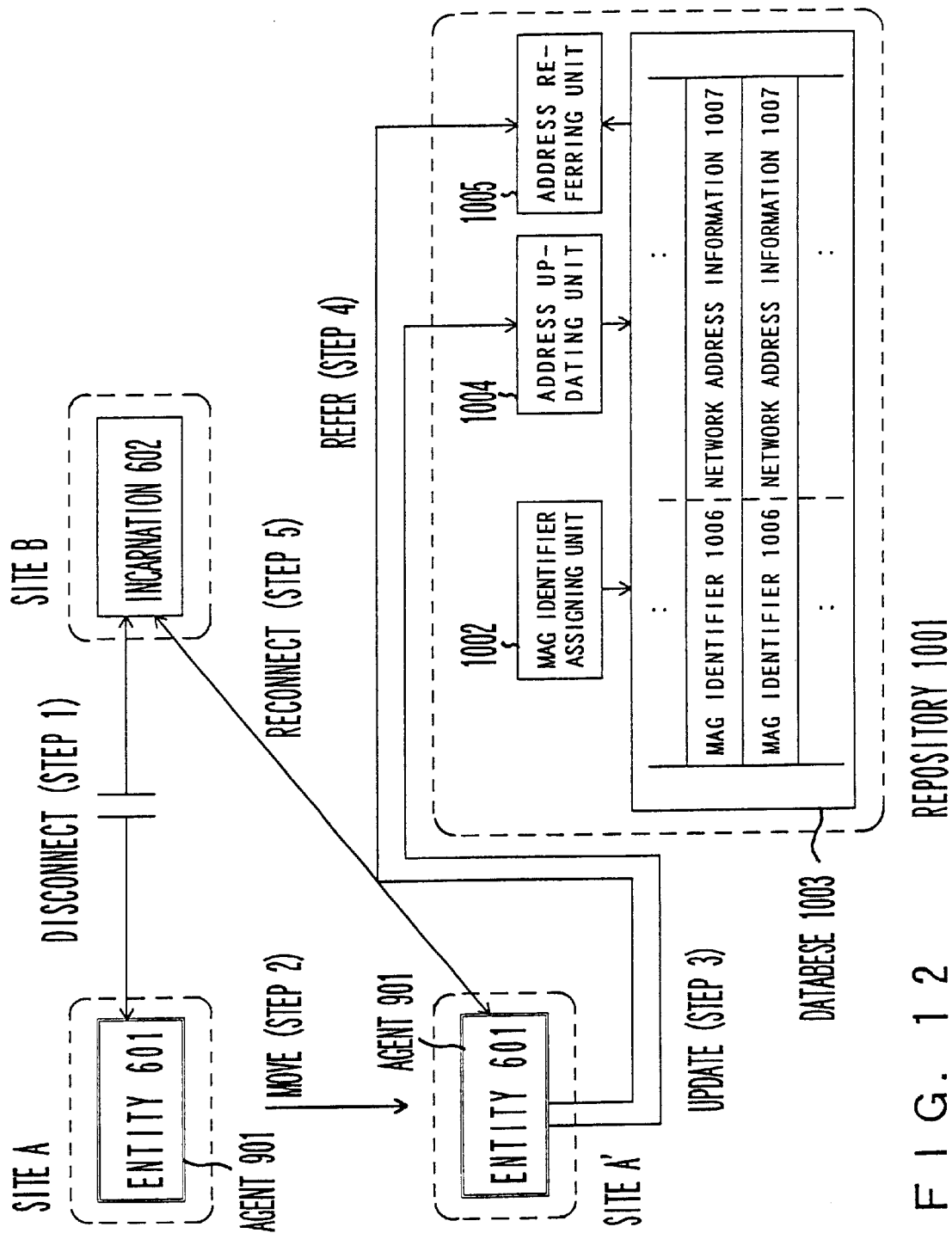
FIG. 12 is a schematic diagram showing an agent movement process (2)

Next, FIG. 12 explains the moving process of the agent 901 using the repository 1001, which corresponds to FIG. 9.

In the same way as shown in FIG. 11, in an initial state where an entity 601 exists at site A and the incarnation 602 corresponding to the entity 601 exist at site B, an entry comprising a MAG identifier 1006 and network address information 1007 corresponding to the entity 601 at site A, and an entry comprising a MAG identifier 1006 and network address information 1007 corresponding to the incarnation 602, respectively, are registered in the database 1003 in the repository 1001.

When an agent 901 moves, the agent 901 moves to site A' being an address in the network (Step 2 in FIG. 12) after an agent 901 at site A disconnects an interface between the entity 601 included in the agent 901 and the incarnation 602 at site B corresponding to the entity 601 (step 1 in FIG. 12).

After the agent 901 moves to site A', the agent 901 reports the network address information 1007 of the site A' to the repository 1001 together with a MAG identifier 1006 corresponding to the entity 601 included in the agent 901. An address updating unit 1004 in the repository 1001 retrieves an entry corresponding to the MAG identifier 1006 reported from site A from a database 1003, and updates the network address information 1007 in the retrieved entry to the network address information reported from site A' (step 3 in FIG. 12).

Then, the entity 601 in the agent 901 which has moved to site A' acquires the network address information 1007 of site B where the incarnation 602 exists, from the repository 1001 (step 4 in FIG. 12), and reconnects itself with the incarnation 602 at site B using the network address information (step 5 in FIG. 12).

In the same way as shown in FIG. 11, when the entity 601 which has moved to site A' or the incarnation 602 at site B acquires the network address information 1007 of site B or the network address information 1007 of site A', from the repository 1001, the entity 601 which has moved to site A' or the incarnation 602 at site B reports the MAG identifier 1006 of the incarnation 602 being a communicating party of the entity 601 or the MAG identifier 1006 of the entity 601, respectively, to the repository 1001, and refers to the MAG identifier 1006 of the incarnation 602 or the MAG identifier 1006 of the entity 601, respectively. On the other hand, an address referencing unit 1005 in the repository 1001 retrieves an entry corresponding to the MAG identifier 1006 of the reported incarnation 602 or the MAG identifier 1006 of the entity 601, and transmits the network address information 1007 in the retrieved entry to the entity 601 and the incarnation 602 in return.

In this way, when the entity 601 moves as shown in FIG. 9, the entity 601 which has moved to site A' and the incarnation 602 at site B can maintain consistency in the connections before and after movement by updating and referring to the database 1003 in the repository 1001 as shown in FIG. 12. In this case, in the same way as shown in FIG. 11, since the database 1003 in the repository 1001 always holds the latest network address information 1007 for the entity 601 and the incarnation 602, such a situation that the moved entity 601 or incarnation 602 may be lost in the network can be avoided.

<Detailed description of agent's moving process>

The detailed operations of the above-described movement process of an agent are described below.

Figure 13A:
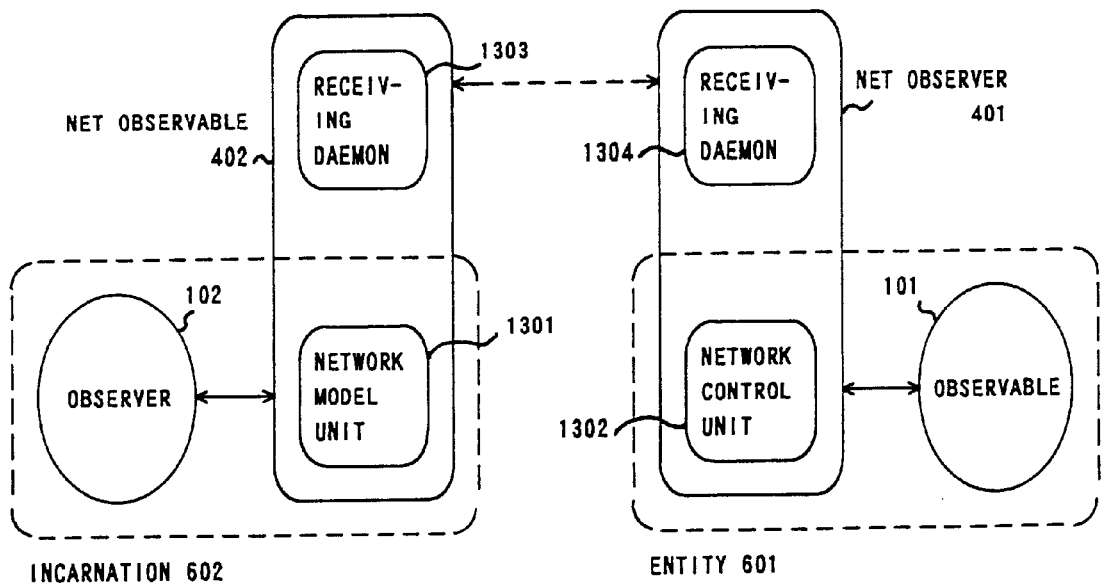
FIG. 13A is a schematic diagram showing a state before disconnection in a disconnecting process.

FIG. 13A shows a state before the movement of an agent, that is, a state before the disconnecting process of the interface between the incarnation 602 and the entity 601.

Before the disconnecting process, as described in detail above referring to FIG. 4, an observer 102 in the incarnation 602 and an observable 101 in the entity 601 communicate with each other through a net observable 402 possessed by the incarnation 602 and a net observer 401 possessed by the entity 601. Commands from the other party are received by a receiving daemon 1303 in the net observable 402 or a receiving daemon 1304 in the net observer 401 (see (b) in FIG. 4). A network model unit 1301 in the net observable 402 provides the observer 102 in the incarnation 602 with a slot interface. A network control unit 1302 in the net observer 401 relay communication between the receiving daemon 1304 and the observable 101 in the entity 601.

Figure 13B:
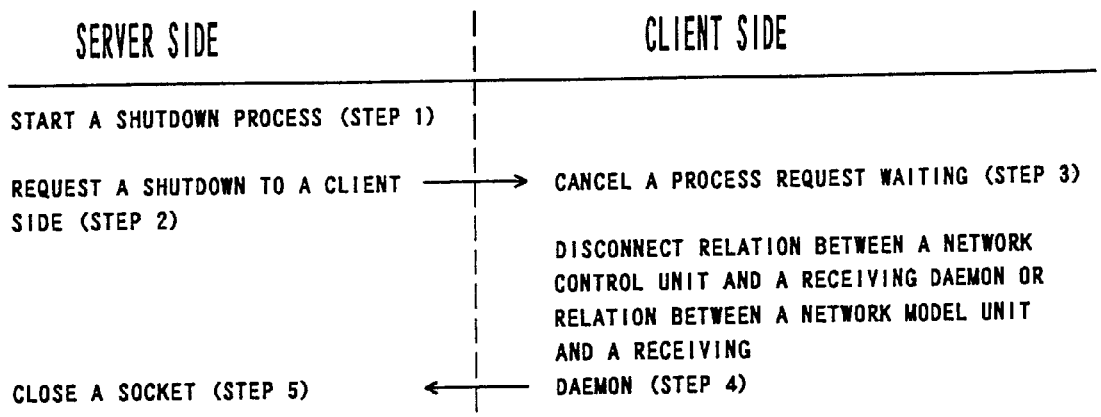
FIG. 13B is a schematic diagram showing a disconnecting process.

FIG. 13B shows a disconnecting process. The site at which an agent to move exists and the site at which the entity 601 or the incarnation 602 communicating with the incarnation 602 or the entity 601 included in the agent exists, shall be called a server side and a client side, respectively.

First, a shutdown process is started by an agent on the server side (step 1 in FIG. 13B).

Then, a shutdown request is transmitted from the server side to the client side (step 2 in FIG. 13B).

When the client side receives the shutdown request, the client side cancels a process waiting for a process request on its own side (step 3 in FIG. 13B), and disconnects the reference relation between the network control unit 1302 on its own side and the receiving daemon 1304 or the reference relation between the network model unit 1301 and the receiving daemon 1303 (step 4 in FIG. 13B). The result of this disconnecting process is returned to the server side.

When the server side receives the result of the above-mentioned disconnecting process, the server side disconnects the reference relation between the network model unit 1301 on its own side and the receiving daemon 1303 or the reference relation between the network control unit 1302 and the receiving daemon 1304, and closes a socket (step 5 in FIG. 13B).

Figure 13C:
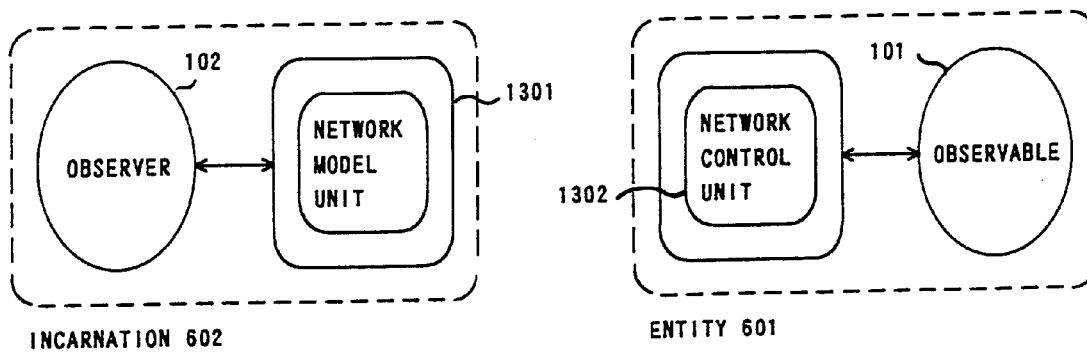
FIG. 13C is a schematic diagram showing a state after disconnection in a disconnecting process.

FIG. 13C shows the state of an incarnation 602 and an entity 601 after a disconnecting process. As seen from this diagram, in this case, receiving daemons 1303 and 1304 which have been carrying out network communication are removed.

Figure 14:
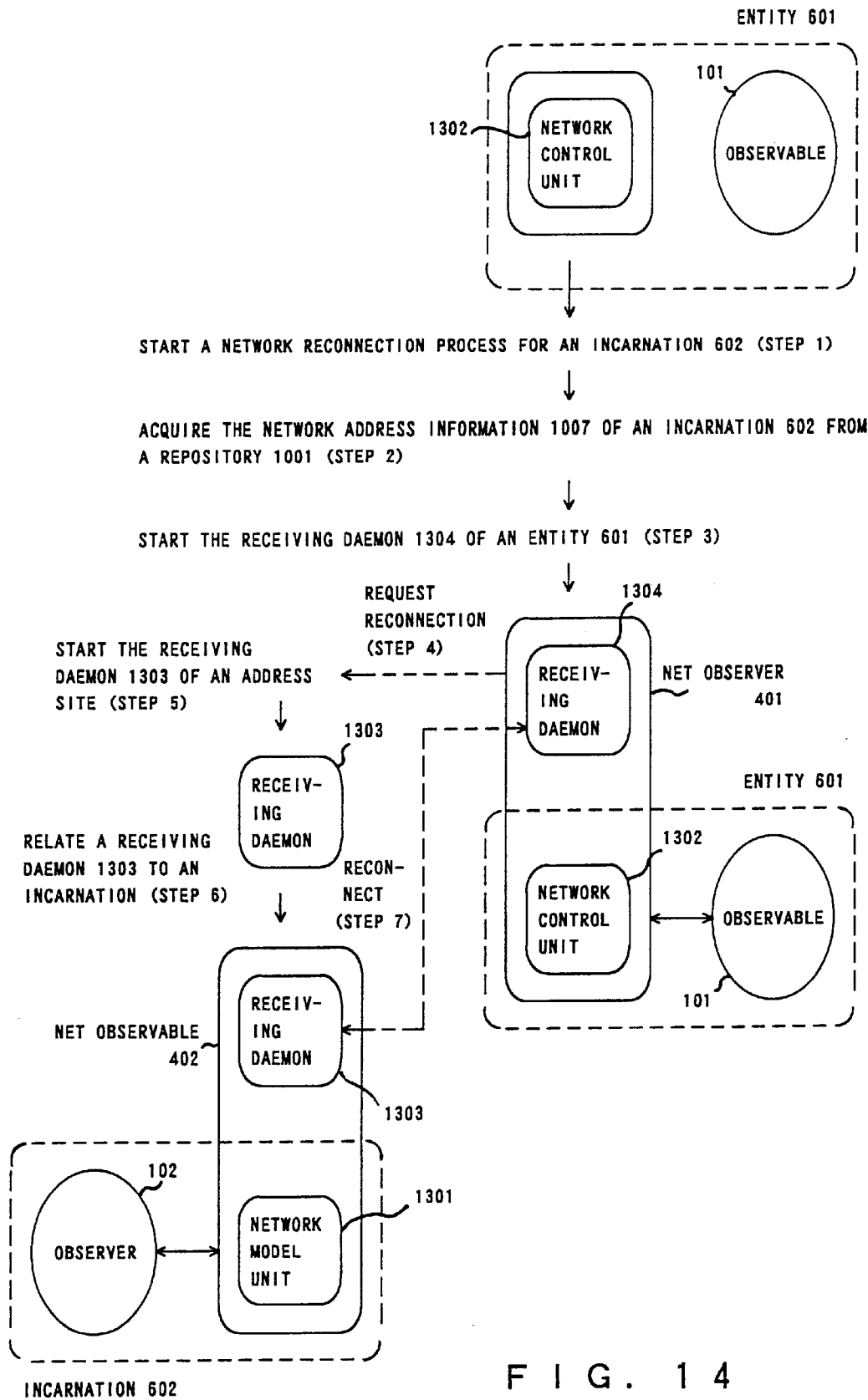
FIG. 14 is a schematic diagram showing a re-connecting process triggered by an entity.

FIG. 14 explains a reconnecting process after an agent including an entity 601 moves in a network as shown in FIG. 9.

In this case, a reconnecting process is triggered by an entity 601 in an agent 901 and is executed.

First, at a site after a movement, a network control unit 1302 of the entity 601 in the agent 901 starts a network reconnecting process for the incarnation 602 corresponding to the entity 601 (step 1 in FIG. 14).

Then, as described above, the network control unit 1302 acquires network address information 1007 of the site where the incarnation 602 exists, from a repository 1001, by reporting a MAG identifier 1006 of the incarnation 602 with which it has been communicating before disconnection, to the repository 1001, not shown in the drawing (see FIG. 12), and by referring to the MAG identifier 1006 of the incarnation 602 (step 2 in FIG. 14).

Then, the network control unit 1302 starts a receiving daemon 1304 corresponding to the entity 601 (step 3 in FIG. 14).

Then, the started receiving deamon 1304 transmits a reconnection request to the site where the incarnation 602 exists using the network address information acquired from the repository 1001 (step 4 in FIG. 14).

At the site where the incarnation 602 exists, when the above mentioned reconnection request is received, a network service starting unit (e.g., inetd deamon) starts a receiving deamon 1303 corresponding to the incarnation 602 (step 5 in FIG. 14).

Further, at the site where the incarnation 602 exists, a kernel establishes the relationship between the above mentioned receiving deamon 1303 and the incarnation 602 (step 6 in FIG. 14). More specifically, reference relationship (e.g., reference relationship of a memory address) is established between a network model unit 1301 in the incarnation 602 and the receiving deamon 1303.

As a result, the reconnection between the entity 601 and the incarnation 602 corresponding to the entity 601 is completed (step 7 in FIG. 14).

Figure 15:
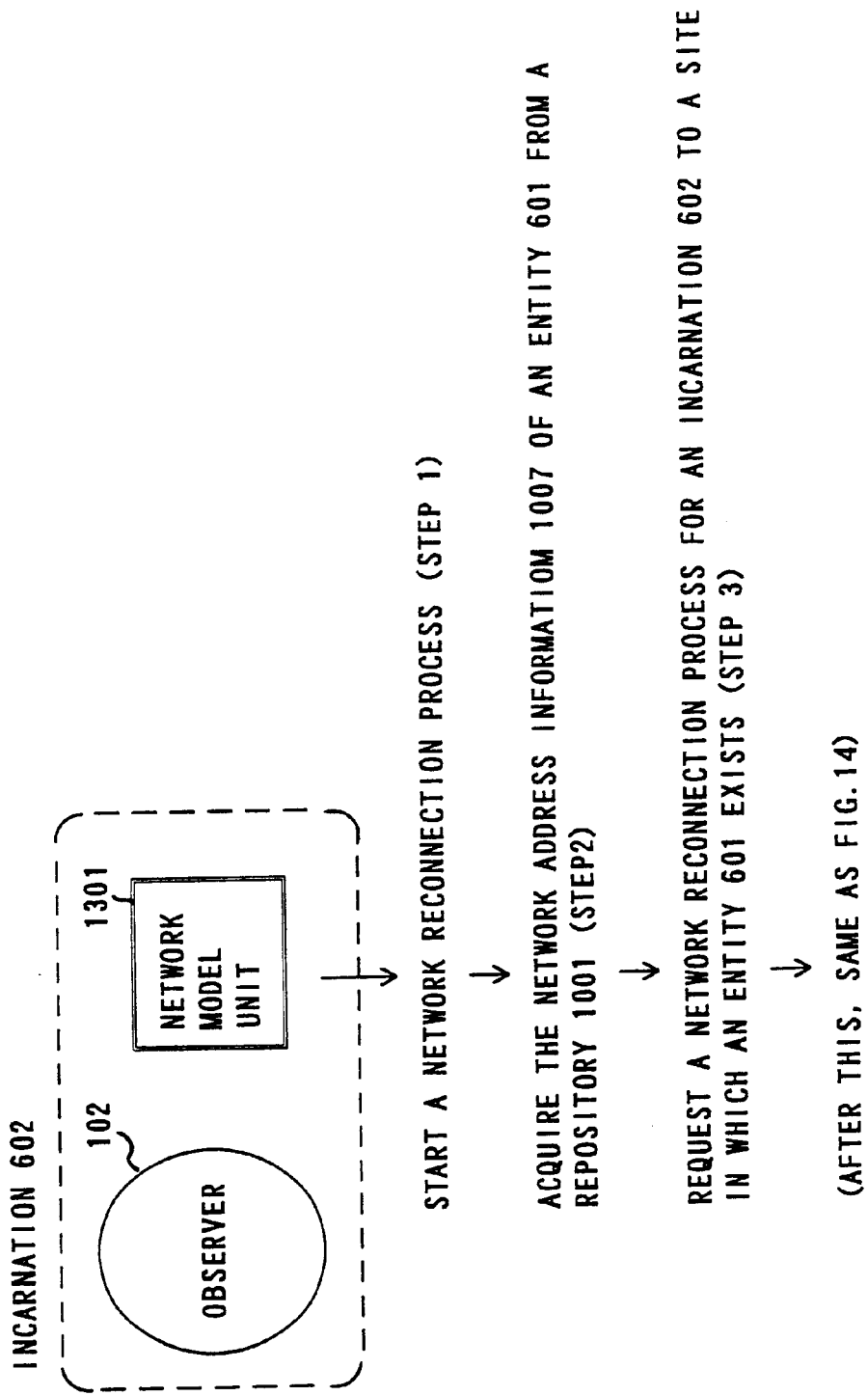
FIG. 15 is a schematic diagram showing a re-connecting process triggered by an incarnation.

FIG. 15 explains a reconnection process after an agent 801 including an incarnation 602 moves in a network as shown in FIG. 8.

In this case, a reconnecting process is triggered by an incarnation 602 in an agent 801 and is executed.

First, at a site after a movement, a network model unit 1301 of the incarnation 602 in the agent 801 starts a network reconnecting process for the entity 601 corresponding to the incarnation 602 (step 1 in FIG. 15).

Then, as described above, the network model unit 1301 acquires network address information 1007 of the site where the entity 601 exists, from a repository 1001 by reporting a MAG identifier 1006 of the entity 601 with which it has been communicating before disconnection, to the repository 1001, not shown in the drawing (see FIG. 11), and referring to the MAG identifier 1006 of the incarnation 602 (step 2 in FIG. 15).

Then, the network model unit 1301 transmits a reconnection request to the site where the entity 601 exists using the network address information 1007 acquired from the repository 1001 (step 3 in FIG. 15).

At the site where the entity 601 exists, when the above mentioned reconnection request is received, a series of processes shown in FIG. 14 are started and finally the entity 601 is reconnected with the incarnation 602 corresponding to the entity 601.

<Description of distributed job execution system to be realized by this preferred embodiment of the invention>

A distributed job execution system to be realized by applying the above mentioned preferred embodiment of the present invention is described below.

In this system job steps composing a batch job can be distributed and executed by computers at a plurality of sites, those job steps can be operated in cooperation with each other, and all the job steps can be managed unitedly at one site.

First, each job step is incorporated as an entity 601. More specifically, an observable 101 (see FIG. 6) in the entity 601 has a job step execution function. In the example shown in FIG. 16 entities 601 (#1) and 601 (#2) are job steps.

Figure 16:
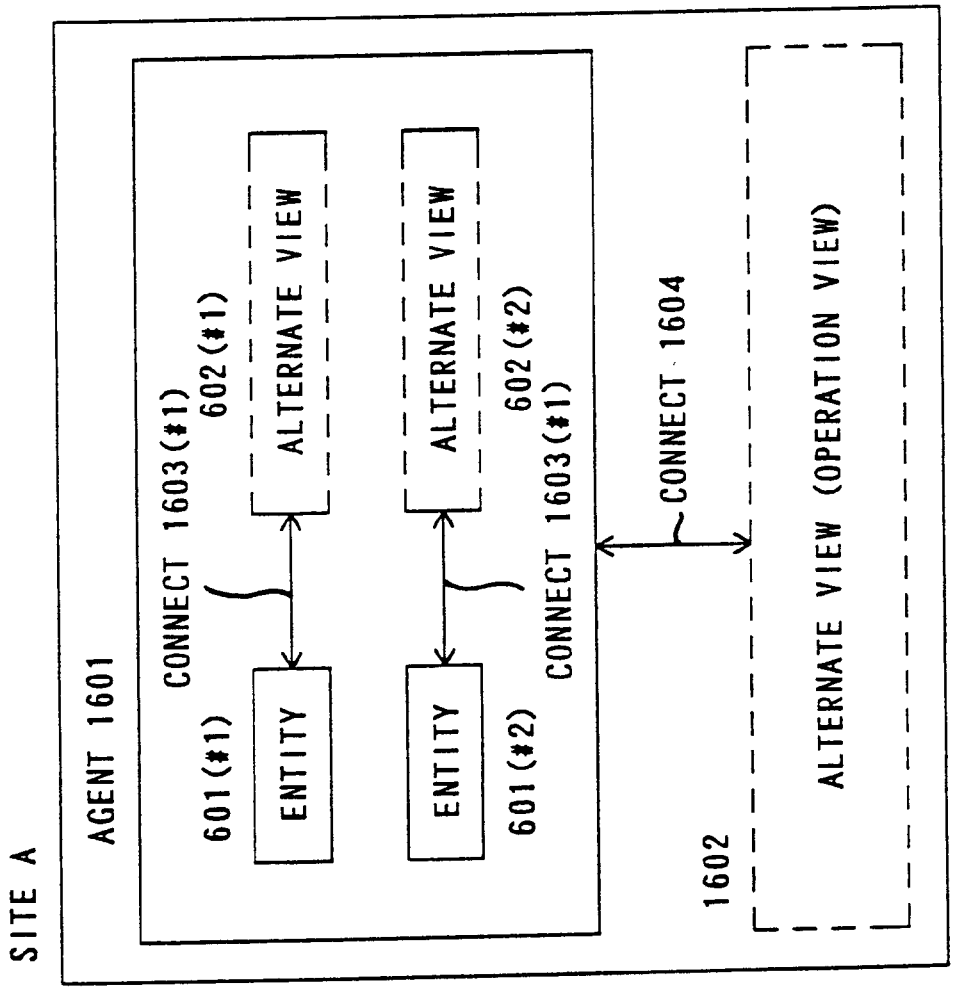
FIG. 16 is a schematic diagram showing a distributed job execution system in a preferred embodiment of the invention.

Then, as shown FIG. 16, in the entities 601 (#1) and 601 (#2), alternative views 602 (#1) and 602 (#2) corresponding to the entities 601 (#1) and 601 (#2), respectively, are generated, and an agent 1601 including the entities 601 (#1) and 601 (#2) and alternative views 602 (#1) and 602 (#2) is defined. As a result, the entities 601 (#1) and 601 (#2) and alternative views 602 (#1) and 602 (#2) become movable in the network.

The entities 601 (#1) and 601 (#2) and alternative views 602 (#1) and 602 (#2) are registered in a repository 1001, not shown in the drawing, together with network address information 1007 (loop back address) of a local site, and are given a MAG identifier by the repository 1001. Connections 1603 (#1) and (#2) are established by the entity 601 (#1) and alternative view 602 (#1), and the entity 601 (#2) and alternative view 602 (#2), respectively. All the control is carried out based on a connection controlling process between the above mentioned entity 601 and incarnation 602.

The alternative views 602 (#1) and 602 (#2) have only interfaces for controlling the execution of job steps being entities 601 (#1) and 601 (#2), respectively, and all the interfaces are established through a slot 103 defined in each net observable 402, not shown in the drawing, in the above mentioned alternative views 602 (#1) and 602 (#2) and in each observable 101, not shown in the drawing, of the entities 601 (#1) and 601 (#2).

Then, at site A an alternative view 1602 being an operation view for an agent 1601 itself is defined. This alternative view 1602 has only an interface for controlling job steps being entities 601 (#1) and 601 (#2) in the agent 1601 through alternative views 602 (#1) and 602 (#2) in the agent 1601, respectively.

In this case, an observer 102, not shown in the drawing, in the alternative view 1602 accesses each slot 103 of each of alternative views 602 (#1) and 602 (#2) in the agent 1601 from each slot 103 of a net observable 402, not shown in the drawing, in the alternative view 1602 through a net observer 401, not shown in the drawing, and further accesses each slot 103 of an observable 101 in each of the entities 601 (#1) and 601 (#2) from each slot 103 of a net observable 402, not shown in the drawing, in the alternative view 1602 through an net observer 401, not shown in the drawing, in the agent 1601.

The agent 1601 and the alternative view 1602 are registered in a repository 1001 not shown in the drawing together with network address information 1007 at site A, and are given a MAG identifier 1006 by the repository 1001. A connection 1604 is established by the agent 1601 and the alternative 1602.

As shown in FIG. 16 the agent 1601 generated at site A is then entered into site B based on the program code described in the agent 1601.

As a result, as shown in FIG. 17A, there remains only an alternative view 1602 corresponding to the agent 1601 at site A, and the agent 1601 moves to site B.

Following this movement, network address information 1007 registered in an entry corresponding to the above mentioned agent 1601 of a database 1003 (see FIG. 10) in the repository 1001, not shown in the drawing, is updated from network address information 1007 of site A to network address information 1007 of site B by the agent 1601. Then, a reconnection 1701 is established between the alternative view 1602 at site A and the agent 1601 which has moved to site B, based on this update.

Then, as shown in FIG. 17B, an entity 601 (#1) in the agent 1601 is separated from the agent 1601 based on the program code described in the agent 1601 which has moved to site B, and the execution of a job step being the entity 601

(#1) is started. This job step can also be configured so as to start the execution by an execution start command from the alternative view 1602 at site A.

The agent 1601 at site B is then entered into site C based on the program code described in the agent 1601.

As a result, as shown in FIG. 18A, there remains only an alternative view 1602 corresponding to the agent 1601 at site A, there remains only the entity 601 (#1) being a job step, at site B, and the agent 1601 moves to site C.

Following this movement, network address information 1007 registered in an entry corresponding to the above mentioned agent 1601 of a database 1003 (see FIG. 10) in the repository 1001, not shown in the drawing, is updated from network address information 1007 of site B to network address information 1007 of site C by the agent 1601. Then, a reconnection 1801 is established between the alternative view 1602 at site A and the agent 1601 which has moved to site C, based on this update.

Following this movement, network address information 1007 registered in an entry corresponding to the alternative view 602 (#2) of the above mentioned agent 1601 of a database 1003 (see FIG. 10) in the repository 1001, not shown in the drawing, is updated from network address information 1007 of a local site (loop back address) to network address information 1007 of site C by the agent 1601. Then, a reconnection 1802 is established between the entity 601 (#1) at site B and the alternative view 1602 (#1) in the agent 1601 which has moved to site C, based on this update.

Then, as shown in FIG. 18B, an entity 602 (#1) in the agent 1601 is separated from the agent 1601 based on the program code described in the agent 1601 which has moved to site C, and the execution of a job step being the entity 601 (#2) is started. This job step can also be configured so as to start the execution by an execution start command from the alternative view 1602 at site A.

In this way, the entities 601 (#1) and 601 (#2) in the agent 1601 generated at site A become distributed-executable at sites B and C, respectively.

Thus, the alternative view (operation view) 1602 at site A can access the agent 1601 at site C by means of the connection 1801, and further can access the entity 601 (#1) at site B and the entity 601 (#2) at site C from the alternative views 602 (#1) and 602 (#2) in the agent 1601 through connections 1802 and 1603, respectively. Therefore, each job step being the entities 601 (#1) and 601 (#2) distributed to each site can be unitedly controlled by the alternative view 1602 at site A.

The connections 1801, 1802 and 1603 are not always established during the execution of each job step, but the system can be so configured as to establish these connections if necessary. In this case, the database 1003 in the repository 1001, not shown in the drawing, is referred to in every connection.

As described above, the distributed entry of job data into an arbitrary computer in a network and a distributed job execution system for performing united linkage control of the job data to be distributed and executed, can be easily realized by applying an inter-object communication technique using an agent of this preferred embodiment of the invention.

<Description of work flow system to be realized by this preferred embodiment of the invention>

Lastly, a work flow system to be realized by applying the above mentioned preferred embodiment of the present invention is described below.

Figure 19:
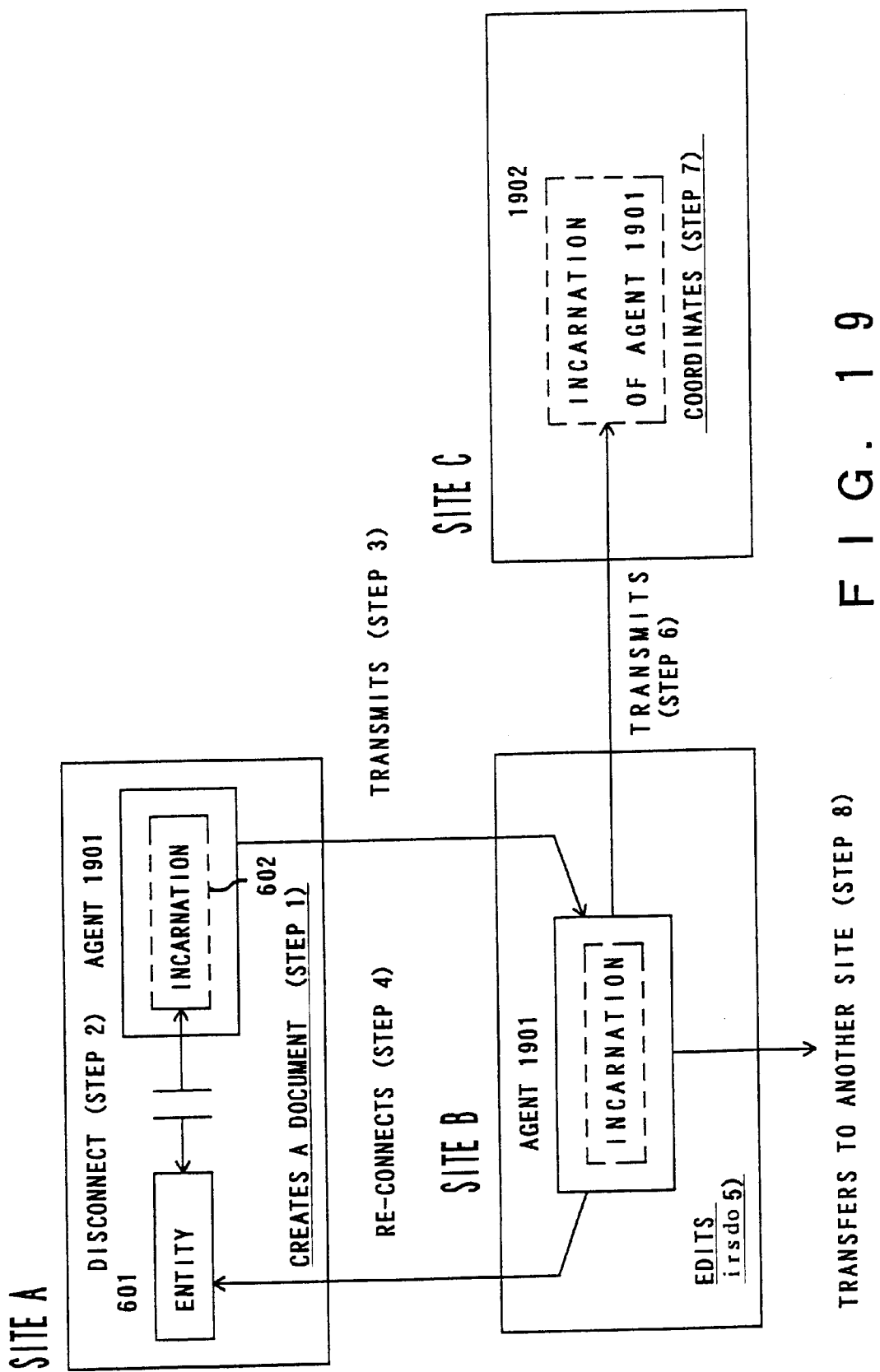
FIG. 19 is a schematic diagram showing a work flow system in the preferred embodiment of the invention.

In this system, as shown in FIG. 19, document data (including multimedia data) is created as an entity 601, for example, at site A. In this case, a creating process (access to document data) is executed using an observer 102 in an incarnation 602 generated at site A corresponding to the above mentioned entity 601 (step 1 in FIG. 19).

Then, an agent 1901 including this incarnation 602 is generated at site A, and the agent 1901 moves from site A to site B. In this case, first, a connection between the entity 601 and the incarnation 602 is disconnected by the agent 1901 (step 2 in FIG. 19), and then the agent 1901 is transmitted from site A to site B according to the code described in the agent 1901 (step 3 in FIG. 19).

Following this transmission, network address information 1007 registered in an entry corresponding to the incarnation 602 of a database 1003 (see FIG. 10) in the repository 1001, not shown in the drawing, is updated from network address information 1007 of a local site (loop back address) to network address information 1007 of site B by the agent 1901. Then, a reconnection is established between the incarnation 602 in the agent 1901 and the entity 601 at site A, based on this update (step 4 in FIG. 19).

As a result, an operator at site B can carry out editing work for document data being an entity 601 at site A using an observer 102 of the incarnation 602 in the agent 1901 (step 5 in FIG. 19).

At this time, an incarnation 1902 is generated at site B for the entire agent 1901, and is transmitted to another site C (step 6 in FIG. 19). Then, an operator at site C can implement the work for document data being an entity 601 at site A by cooperating with the operator at site B (step 7 in FIG. 19).

After the work at site B is finished, the agent 1901 at site B is further relayed to another site, and the same work is carried out.

In this way, a work flow system can be easily realized by applying an inter-object communication technique using an agent of this preferred embodiment of the invention.

In the above mentioned work flow system, since document data itself being an entity 601 remains at site A and is not relayed to another site, the work flow system has a feature that protection measures such as protection of a document from alteration, etc. can be easily realized.

<Another preferred embodiment of the invention>

In the preferred embodiment described above, although a reconnecting process between an incarnation 602 and an entity 601 after either of the incarnation 602 and the entity 601 moves in a network, is executed while referring to a database 1003 in a repository 1001 for network address information 1007 of the incarnation 602 or the entity 601, the present invention is not limited to this. If it is guaranteed that either of MAGs 501 (entity 601 or incarnation 602) moves, the inter-object communication system can be so configured that a moved MAG 501 (incarnation 602 or entity 601) may report its own network address information 1007 to the other unmoved MAG 501 (entity 601 or incarnation 602) directly.

<Supplement on recording medium with recorded program for realizing this preferred embodiment of the invention>

When the present invention is used with a computer, the inter-object communication system can also be used as a computer-readable recording medium for making the computer perform the same functions as the functions implemented by the above mentioned configuration of the embodiment of the present invention.

Figure 20:
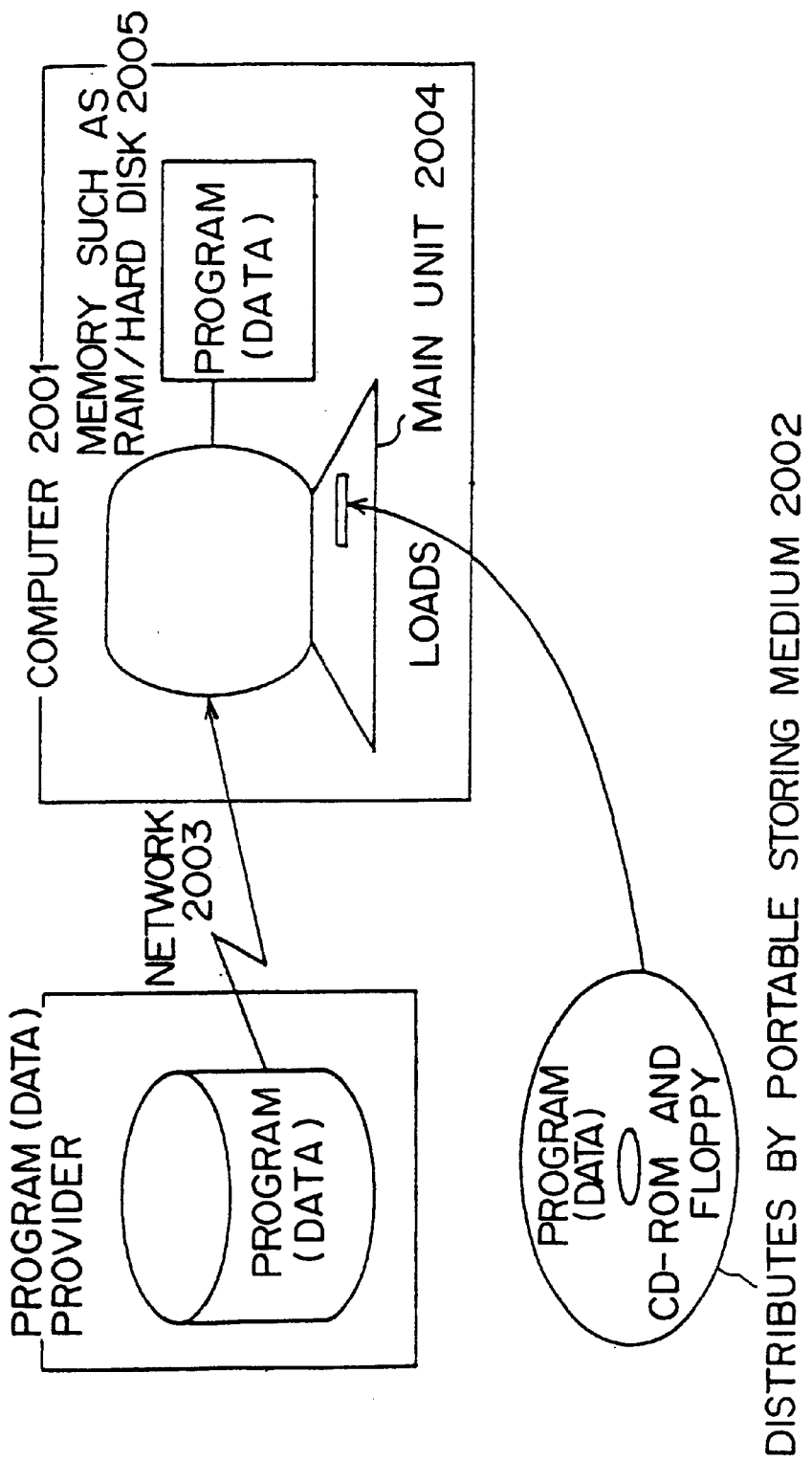
FIG. 20 is a schematic diagram showing an arrangement of recording media containing programs for implementation of the preferred embodiment of the invention.

In this case, as shown in FIG. 20, a program for implementing various kinds of functions of the preferred embodiment of the present invention is loaded into a memory (RAM or hard disk) 2005 in a main unit 2004 of a computer 2001 through, for example, a portable recording medium 2002 such as a floppy disk, a CD-ROM disk, a magneto-optic disk, a removable hard disk, etc. or from a program (data) provider through a network circuit 2003, and executed.

<Description of the effect of the present invention>

As described above, by utilizing one configuration of the present invention when an object moves in a network, the network address information registered in a repository for relating an identification information of the object with a network address information of the site where the object exists and managing the information can be modified, and an inter-object communication route can be reestablished corresponding to the moved object based on the network address information registered in the repository. Thus, consistency in connection between objects can be maintained before and after movement.

By utilizing another configuration of the present invention, when a first object moves to a second site different from a first site in a state where an inter-object communication route is established between a first object at a first site and a second object, first an inter-site communication route is established between the second site and a third site where the above mentioned second object exists after the first object moves, further an inter-object communication route is reestablished between the first object and the second object, and consistency in inter-object connection can be maintained before and after movement. By utilizing such a configuration as to update and refer to a repository from time to time, surer consistency in inter-object connection can also be maintained.

By further utilizing another configuration, consistency in connection between a first MAG on one computer in a network and a second MAG being a MAG referring to the first MAG and which has moved to another computer in the network can be maintained before and after movement by updating and referring to a data set comprising a MAG identifier and network address information in a repository. In this case, since the data set in the repository always holds the latest network address information of the first and second MAGs, such a situation that the moved first or second MAGs may be lost in the network can be avoided.

By utilizing a distributed job execution technique using an inter-object communication technique of the present invention, the distributed entry of job data into an arbitrary computer in a network and united linkage control of the job data to be distributed and executed, can be easily realized.

By utilizing a work flow execution technique using an inter-object communication technique of the present invention, control of work flow can be easily realized between a plurality of computers in a network.

This work flow execution technique also has, for example, a feature that protection measures such as protection from alteration of a document, etc. can be easily realized, since the inter-object communication system can be so configured that work processing data itself included in a first MAG may remain in a specific computer and be prevented from being relayed to another computer, and only a second MAG including an interface for the work processing data may be moved in a network.

In the present invention, if it is guaranteed that either of the first or second MAGs does not move in a network, the inter-object communication system can also be so configured that a moved first or second MAG may report its own network address information to an unmoved first or second MAG, and a communication linkage may be established between the first and second MAGs based on the network address information.

In the present invention, since the inter-object communication system can also be so configured that access to an observable object in a first MAG from an observer object in a second MAG through a network observable object in a second MAG may be executed according to the slot name of a slot defined in the observer object and network observable object, the relation between objects can be dynamically determined through designation of the slot name (slot descriptor) without specifying the relation in a source code for defining a class when executing. In this way, the development and operation of a flexible and efficient inter-object communication system can be realized.

What is claimed is:

1. An inter-object communication system for communicating between objects which are movable between a plurality of sites connected through networking, comprising:

a first object which is an object set comprising a first communication object being an object including an access procedure having a function to directly access data and a first relay object being an object including an access process to said data by the access procedure in said communication object, in a first site of said network;

a second object which is an object set comprising a second relay object having an access procedure for indirectly accessing said data possessed by said first communication object included in the first object through said network and a second communication object which accesses said data possessed by said first communication object included in said first object by the access procedure, through said network in a second site being a site in said network and different from or identical to said first site;

a repository for holding a data set comprising object identifiers for identifying said first and second objects and network address information for indicating the addresses of the sites in said network where said first and second objects exists, in said network;

a repository updating unit updating network address information in said data set including the first or second object identifier held by said repository to network address information indicating a site in which the first or second object identifier corresponding to said first or second object which has moved in said network when the first or second object moves in said network; and an inter-object communication route reestablishing unit reestablishing communication between the first or second object which has moved in said network and another second or first object which has communicated through said network based on said network address information registered in said repository.

2. An inter-object communication system for communicating between objects which are movable between a plurality of sites connected through networking, comprising:

a first object which is an object set comprising a first communication object being an object including an access procedure having a function to directly access data and a first relay object being an object including an access process to said data by the access procedure in said communication object, in a first site of said network;

a second object which is an object set comprising a second relay object having an access procedure for indirectly accessing said data possessed by said first communication object included in the first object through said network and a second communication object which accesses said data possessed by said first communication object included in said first object by the access procedure, through said network in a second site being a site in said network and different from or identical to said first site;

a repository for holding a data set comprising object identifiers for identifying said first and second objects and network address information for indicating the addresses of the sites in said network where said first and second objects exists, in said network;

a repository updating unit updating network address information in said data set including the first or second object identifier held by said repository to network address information indicating a site in which the first or second object which has moved in said network newly exists by designating a object identifier corresponding to said first or second object which has moved in said network when the first or second object moves in said network;

an inter-site communication route establishing unit establishing an inter-site communication route between a third site and said second site where said second object exists after the movement of a first object based on said network address information held by said repository when said first object moves to the third site different from said first site in a state where an inter-object communication route is established between said first object at said first site and said second object; and an inter-object communication route reestablishing unit reestablishing an inter-object communication route between said first object and said second object using this established inter-site communication route and network address information held by repository.

3. An inter-object communication method for communicating between objects which are movable between a plurality of sites connected through networking, comprising the steps of:

generating a first object which is an object set comprising a first communication object being an object including an access procedure having a function to directly access data and a first relay object being an object including an access process to said data by the access procedure in said communication object, in a first site of said network;

generating a second object which is an object set comprising a second relay object having an access procedure for indirectly accessing said data possessed by said first communication object included in the first object through said network and a second communication object which accesses said data possessed by said first communication object included in said first object by the access procedure, through said network in a second site being a site in said network and different from or identical to said first site;

updating network address information in data set including the first or second object indentifier to network address information indicating a site in which the first or second object which has noved in said network newly exists by designating a object identifier corresponding to said first or second object which has moved in said network when the first or second object moves in said network, the data set which is held by a repository, comprising object identifiers for identifying said first and second objects and network address information for indicating the addresses of the sites in said network where said first and second objects exist;

and reestablishing communication between the first or second object which has moved in said network and another second or first object which has communicated through said network based on said network address information registered in said repository.

4. An inter-object communication method for communicating between a plurality of objects movable in a network through said network, comprising:

generating a first MAG being an object set comprising an observable object being an object including an access procedure having a function to directly access data and a function to relay an access process to said data by the access procedure in said observable object, in a first computer of said network;

generating a second MAG being an object set comprising a net observable object having an access procedure for indirectly accessing said data possessed by said observable object included in the first MAG through said network and an observer object which accesses said data possessed by said observable object included in said first MAG by the access procedure, through said network in a second computer being a computer in said network and different from or identical to said first computer;

composing a repository being a server computer for holding a data set comprising MAG identifiers for identifying said first and second MAGs and network address information for indicating the addresses of the sites in said network where said first and second MAGs exist, in said network;

allowing the first or second MAG to disconnect the communication with another second or first MAG communicating through said network and then to move in said network when the first or second MAG moves in said network;

allowing the first or second MAG which has moved in said network to update network address information in said data set including the designated MAG identifier held by said repository to network address information indicating a computer in which the first or second MAG which has moved in said network newly exists by designating a MAG identifier corresponding to said first or second MAG which has moved in said network; and allowing the first or second MAG which has moved in said network to trigger said another second or first MAG which has communicated through said network and allowing said first or second MAG and said another second or first MAG to reestablish communication with each other by referring to said data set held by said repository corresponding to said first or second MAN and said another second or first MAG.

5. The inter-object communication method for communicating between objects movable in a network according to claim 4, comprising:

defining one set or more of slot data in which a slot name, said data, and an access procedure code for accessing the data are stored, in said observable object of said first MAG:

incorporating into said first MAG all or a part of functions of a net observer object in which at least a first receiving procedure code for receiving access information of said observable object from said network, a first method code for specifying an arbitrary said slot data defined in said observable object based on the access information by designating said slot name stored in the slot data, a second method code for accessing said data stored in the slot data by designating and executing an access procedure code to be stored in said slot data specified by said first method code based on said access information, and a first transmitting procedure code for transmitting the access result to the transmitter of said received access information through said network, are defined;

defining one set or more of slot data in which at least the same slot name as a slot name stored in the first slot data being slot data corresponding to a first slot data being said slot data defined in said observable object in said first MAG, and an access procedure code for transmitting access information for making said net observer object access said access process code stored in said first slot data, to the net observer object through said network, are stored;

and defining said net observable object, a first method code for specifying an arbitrary said slot data defined in said net observable object by designating said slot name stored in the slot data, and a second method code for designating and executing said access procedure code stored in said slot data specified by the first method code, in said observer object of said second MAG.

6. The distributed job execution method using the communication method according to claim 4, comprising:

generating an agent including one or more of MAG sets comprising said firstMAG in which said data is job data, and said second MAG to communicate with the first MAG, in a fourth computer of said network;

generating a third MAG comprising said net observable object having an access procedure for indirectly accessing said job data possessed by said observable object in said first MAG connected with the second MAG through said second MAG in the said agent, through said network, and said observer object for executing the access procedure in a fifth computer being a computer in said network and identical to or different from said fourth;

composing said repository being a server computer for holding a data set including MAG identifiers for identifying each of said first, second and third MAGs and said agents, and network address information indicating the addresses of the sites where said first, second and third MAGs and said agent exist in said network, in said network;

allowing the agent to disconnect a connection with said third MAG through said network and allowing the agent to move in said network;

allowing the agent which has moved in said network to update network address information in said data set including the designated MAG identifier held by said repository to network address information indicating a computer in which the agent which has moved in said network newly exists by designating a MAG identifier corresponding to said agent which has moved in said network;

allowing the agent which has moved in said network to trigger said third MAG and allowing said agent and said third MAG to reestablish communication with each other by referring to said data set held by said repository corresponding to the agent and the third MAG;

allowing said agent to separate said first MAG in said MAG set including in the agent and allowing said agent to disconnect the connection between said first MAG to be separated and the second MAG communicating through said network in said MAG set, then separate said first MAG when the separated first AG is executed in the computer to which said agent belongs to;

allowing the separated first MAG to update the network address information in said data set including the designated MAG identifier storing said repository to one indicating the computer in which said separated first MAG newly exists, by designating a MAG identifier corresponding to the separated first MAG, allowing said separated first MAG to trigger said second MAG communicating through said network and allowing the first and second MAGs to reestablish communication with each other by referring to said data set held by said repository corresponding to the first and second MAGs;

allowing the agent to move in said network while executing the connecting process of communication between the agent and said third MAG, the reestablishing process between said first and second MAGs in said MAG set included in the agent, and the separating process of said first MAG in said MAG set included in the agent; and allowing said third MAG to access said agent from time to time, and further to access said each of the job data possessed by each of said observable objects in each of said first MAG executed in an arbitrary computer in said network corresponding to each of the second MAG in each said data set included in the agent.

7. The inter-object communication system for executing each of objects using a distributed job execution method according to claim 6.

8. A method for executing a work flow using the communication method according to claim 4, comprising:

generating said first MAG in which said data is work processing data in a first computer in said network;

generating said second MAG to communicate with the first MAG in said second computer being a computer in said network and identical to or different from said first computer;

allowing the second MAG to move in said network while executing the reestablishing process of communication with said first MAG; and allowing an operator of each computer at the site where said second MAG has moved to access said work processing data possessed by said observable object in said first MAG through said network.

9. The method for executing a work flow using the communication method according to claim 8, comprising:

generating a fourth MAG comprising said net observable object having an access procedure for indirectly accessing said work processing data possessed by said observable object in said first MAG connected with the second MAG through said second MAG, and said observer object for executing the access procedure in an arbitrary computer of said network;

and allowing an operator of a computer in which said fourth MAG exists to cooperate with an operator of a computer in which said second MAG exists, to be connected with the said fourth MAG and to access said work processing data possessed by said observable object in said first MAG through said network.

10. The inter-object communication system for executing each of objects using a work flow execution method according to claim 8.

11. The inter-object communication system for executing each of objects using an inter-object communication method according to claim 4.

12. An inter-object communication method for communicating between a plurality of objects movable in a network through said network, comprising:

generating a first MAG being an object set comprising an observable object being an object including an access procedure having a function to directly access data and a function to relay an access process for said data by the access procedure in said observable object between the observable object and said network in a first computer of said network;

generating a second MAG being an object set comprising a net observable object having an access procedure indirectly accessing said data possessed by said observable object included in the first MAG through said network and an observer object accessible to said data possessed by said observable object included in said first MAG by the access procedure, in a second computer different from or identical to said first computer in said network;

allowing said first or, second MAG to disconnect a connection between another second or first MAG communicating through said network and then to move in said network when said first or second MAG moves in said network;

allowing said first or second MAG which has moved in said network and said other second or first MAG which has been disconnected the communication with said first or second MAG to reestablish the connection with each other by reporting network address information of a third computer in which the first or second MAG newly exists to said another second or first MAG which has been communicating with said first or second MAG through said network.

13. A computer-readable storing medium storing an inter-object communication program for communicating between objects which are movable between a plurality of sites connected through networking, comprising the functions of:

generating a first object which is an object set comprising a first communication object being an object including an access procedure having a function to directly access data and a first relay object being an object including an access process to said data by the access procedure in said communication object, in a first site of said network;

generating a second object which is an object set comprising a second relay object having an access procedure for indirectly accessing said data possessed by said first communication object included in the first object through said network and a second communication object which accesses said data possessed by said first communication object included in said first object by the access procedure, through said network in a second site being a site in said network and different from or identical to said first site;

updating network address information in data set including the first or second object identifier to network address information indicating a site in which the first or second object which has moved in said network newly exists by designating a object identifier corresponding to said first or second object which has moved in said network when the first or second object moves in said network, the data set which is held by a repository, comprising object identifiers for identifying said first and second objects and network address information for indicating the addresses of the sites in said network where said first and second objects exist; and reestablishing communication between the first or second object which has moved in said network and another second or first object which has communicated through said network based on said network address information registered in said repository.

14. An apparatus comprising:

an object movable between computers of a network and comprising:

a relay object; and a communication object including communication information to be communicated and establishing communication with another object via the relay object, wherein the relay object relaying the communication to the another object by using network address information which is assigned to an identifier of the object as the object moves; and a repository, accessible by the object, registering network address information indicating a location of the object identified by the identifier, wherein the communication is established via relay objects comprising the relay object, said relay objects using the network address information while the communication information is not communicated between the objects.

* * * * *